(12) United States Patent
Yuan et al.

(10) Patent No.: US 12,536,261 B2
(45) Date of Patent: Jan. 27, 2026

(54) DEVICE ENABLING METHOD AND APPARATUS, AND STORAGE MEDIUM

(71) Applicant: HUAWEI TECHNOLOGIES CO., LTD., Guangdong (CN)

(72) Inventors: Tingqiu Yuan, Shenzhen (CN); Libin Zhang, Beijing (CN); Chang Liu, Shenzhen (CN); Huimin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 17/985,322

(22) Filed: Nov. 11, 2022

(65) Prior Publication Data
US 2023/0076085 A1 Mar. 9, 2023

Related U.S. Application Data

(63) Continuation of application No. PCT/CN2020/140949, filed on Dec. 29, 2020.

(30) Foreign Application Priority Data

May 14, 2020 (CN) .......................... 202010408270.1

(51) Int. Cl.
*G06F 21/32* (2013.01)
(52) U.S. Cl.
CPC .................................... *G06F 21/32* (2013.01)
(58) Field of Classification Search
CPC ....... G06F 21/32; H04W 12/55; H04W 12/06; H04L 63/0861; G07C 9/26
See application file for complete search history.

(56) References Cited

U.S. PATENT DOCUMENTS

| | | | |
|---|---|---|---|
| 8,887,259 B1 * | 11/2014 | Harding | G06F 21/6254 713/185 |
| 9,569,605 B1 * | 2/2017 | Schneider | H04L 9/3231 |
| 10,957,136 B1 * | 3/2021 | Kocher | G07C 9/23 |
| 2011/0032076 A1 * | 2/2011 | Rickman | G06V 40/70 340/5.82 |
| 2012/0200601 A1 * | 8/2012 | Osterhout | G02B 27/017 345/633 |

(Continued)

FOREIGN PATENT DOCUMENTS

| | | | |
|---|---|---|---|
| CN | 102045162 A | * | 5/2011 |
| CN | 104144377 A | | 11/2014 |

(Continued)

OTHER PUBLICATIONS

Office Action dated Mar. 18, 2024 issued for Chinese Application No. 202010408270.1 (8 pages).

(Continued)

*Primary Examiner* — Khalid M Almaghayreh

(57) ABSTRACT

A device enabling method and apparatus, and a storage medium relate to: collecting at least two types of biometric feature information of a user; performing identity authentication on the user based on the at least two types of biometric feature information; and if identity authentication succeeds, enabling at least one of a wearable device and a smart device, where the wearable device is communicatively connected to the smart device. This disclosure helps ensure information security of a device.

12 Claims, 7 Drawing Sheets

(56) References Cited

U.S. PATENT DOCUMENTS

| | | | | |
|---|---|---|---|---|
| 2015/0028996 A1* | 1/2015 | Agrafioti | ............... | G06F 21/40 340/5.82 |
| 2016/0379044 A1* | 12/2016 | Tang | ............... | G06V 10/7747 382/118 |
| 2017/0193208 A1* | 7/2017 | Ashley | ............... | G06F 21/32 |
| 2020/0125706 A1* | 4/2020 | Adir | ............... | H04L 9/3231 |
| 2020/0244650 A1* | 7/2020 | Burris | ............... | G10L 17/24 |
| 2021/0073362 A1* | 3/2021 | Alameh | ............... | G06F 21/44 |

FOREIGN PATENT DOCUMENTS

| | | | |
|---|---|---|---|
| CN | 105960196 A | | 9/2016 |
| CN | 106250857 A | | 12/2016 |
| CN | 107609365 A | * 1/2018 ............. G06F 21/32 |
| CN | 108242839 A | | 7/2018 |
| CN | 108429956 A | | 8/2018 |
| CN | 108762644 A | | 11/2018 |
| CN | 109086587 A | | 12/2018 |
| CN | 208227260 U | | 12/2018 |
| CN | 106714023 B | | 3/2019 |
| CN | 109583387 A | | 4/2019 |
| CN | 110866234 A | | 3/2020 |
| CN | 108962240 B | | 9/2021 |

OTHER PUBLICATIONS

Extended European Search Report dated Aug. 23, 2023, issued for European Application No. 20935950.4 (9 pages).

International Search Report dated Mar. 15, 2021, issued for International Application No. PCT/CN2020/140949 3 (10 pages).

Office Action dated Oct. 12, 2024, issued for Chinese Application No. 202010408270.1 (8 pages).

* cited by examiner

DEVICE ENABLING METHOD AND APPARATUS, AND STORAGE MEDIUM

CROSS-REFERENCE TO RELATED APPLICATIONS

This is a continuation of International Patent Application No. PCT/CN2020/140949 filed on Dec. 29, 2020, which claims priority to Chinese Patent Application No. 202010408270.1, filed on May 14, 2020. The disclosures of the aforementioned applications are hereby incorporated by reference in their entireties.

TECHNICAL FIELD

This disclosure relates to the field of application of electronic technologies, and in particular, to a device enabling method and apparatus, and a storage medium.

BACKGROUND

With popularization of a smart device, to ensure information security of the smart device, if a user needs to use the smart device, the smart device first performs identity authentication on the user, and the smart device is enabled after identity authentication succeeds.

For example, when the smart device is in a sleep state with low power consumption, the smart device is woken up after identity authentication performed by the smart device on the user succeeds. For another example, when the user needs to perform payment by using the smart device, the smart device performs a payment operation after identity authentication performed by the smart device on the user succeeds.

Currently, the smart device may capture a voice segment of the user, and match the captured voice segment with a preset voice segment. If the captured voice segment matches the preset voice segment, the smart device determines that identity authentication succeeds, and the smart device is enabled.

However, in a current device enabling solution, the smart device may be enabled provided that the captured voice segment matches the preset voice segment. This enables anyone to enable the smart device. Consequently, security of the device enabling solution is poor.

SUMMARY

This disclosure provides a device enabling method and apparatus, and a storage medium, to help ensure information security of a device. The technical solutions of this disclosure are as follows:

According to a first aspect, a device enabling method is provided. The method includes: collecting at least two types of biometric feature information of a user;

performing identity authentication on the user based on the at least two types of biometric feature information; and if identity authentication succeeds, enabling at least one of a wearable device and a smart device, where the wearable device is communicatively connected to the smart device.

According to a device enabling solution provided in this embodiment of this disclosure, because a device enabling system performs identity authentication on the user based on the at least two types of biometric feature information, information security of a device is ensured.

Optionally, the performing identity authentication on the user based on the at least two types of biometric feature information includes: performing biometric authentication based on the at least two types of biometric feature information and a biometric authentication model; and determining an identity authentication result of the user based on a biometric authentication result.

According to the technical solution provided in this embodiment of this disclosure, because biometric authentication is performed based on the biometric authentication model, intelligence and reliability of the biometric authentication model are ensured.

Optionally, each type of the at least two types of biometric feature information corresponds to one biometric authentication model, and each biometric authentication model is used to perform biometric authentication based on the corresponding biometric feature information. The performing biometric authentication based on the at least two types of biometric feature information and a biometric authentication model includes: performing biometric authentication based on each type of biometric feature information and the corresponding biometric authentication model, to obtain a biometric authentication result corresponding to the biometric feature information. Correspondingly, the determining an identity authentication result of the user based on a biometric authentication result includes: determining the identity authentication result of the user based on biometric authentication results corresponding to the at least two types of biometric feature information.

Optionally, the determining the identity authentication result of the user based on biometric authentication results corresponding to the at least two types of biometric feature information includes: (1) if a biometric authentication result corresponding to any one of the at least two types of biometric feature information indicates that biometric authentication succeeds, determining that identity authentication on the user succeeds; (2) if biometric authentication results corresponding to at least two types of biometric feature information in the at least two types of biometric feature information all indicate that biometric authentication succeeds, determining that identity authentication on the user succeeds; (3) if biometric authentication results corresponding to all biometric feature information in the at least two types of biometric feature information all indicate that biometric authentication succeeds, determining that identity authentication on the user succeeds; or (4) performing weighted calculation on the biometric authentication results corresponding to the at least two types of biometric feature information, and determining the identity authentication result of the user based on a result obtained through weighted calculation.

According to the device enabling solution provided in this embodiment of this disclosure, a success rate of identity authentication in implementation (1) is the highest, security of identity authentication in implementation (3) is the highest, both a success rate and security of identity authentication in implementation (2) are between those of implementation (1) and implementation (3), and flexibility of identity authentication in implementation (4) is high. By setting weights corresponding to different biometric feature information, a success rate and security may be balanced in the final identity authentication result.

Optionally, the at least two types of biometric feature information correspond to one comprehensive biometric authentication model. The performing biometric authentication based on the at least two types of biometric feature information and a biometric authentication model includes: performing biometric authentication based on the at least two types of biometric feature information and the biometric authentication model, to obtain a biometric authentication result corresponding to the at least two types of biometric feature information. Correspondingly, the determining an identity authentication result of the user based on a biometric authentication result includes: determining the biometric authentication result corresponding to the at least two types of biometric feature information as the identity authentication result of the user.

Optionally, before the performing biometric authentication based on the at least two types of biometric feature information and a biometric authentication model, the method further includes: performing training based on sample data to generate the biometric authentication model.

According to the device enabling solution provided in this embodiment of this disclosure, the biometric authentication model is trained based on the sample data, so that biometric authentication can be performed based on the biometric feature information and the biometric authentication model, to perform identity authentication on the user.

Optionally, each type of the at least two types of biometric feature information corresponds to one biometric authentication model. The sample data includes at least two types of sample feature information and sample authentication results corresponding to the at least two types of sample feature information, and each type of sample feature information is one type of biometric feature information. The performing training based on sample data to generate the biometric authentication model includes: inputting each type of sample feature information into a first initial authentication model to perform feature authentication, to obtain a feature authentication result corresponding to the sample feature information; adjusting a model parameter of the first initial authentication model based on the feature authentication result corresponding to the sample feature information and the sample authentication result corresponding to the sample feature information until a difference between the feature authentication result obtained through feature authentication based on the sample feature information and the sample authentication result corresponding to the sample feature information meets a preset condition; and determining an authentication model that meets the preset condition as the biometric authentication model corresponding to the biometric feature information.

According to the device enabling solution provided in this embodiment of this disclosure, the biometric authentication model corresponding to each type of biometric feature information is trained, so that biometric authentication can be performed based on each type of biometric feature information and the corresponding biometric authentication model, to perform biometric authentication on the at least two types of biometric feature information.

Optionally, the at least two types of biometric feature information correspond to one comprehensive biometric authentication model. The sample data includes at least two types of sample feature information and a sample authentication result corresponding to the at least two types of sample feature information, and each type of sample feature information is one type of biometric feature information. The performing training based on sample data to generate the biometric authentication model includes: inputting the at least two types of sample feature information into a second initial authentication model to perform feature authentication, to obtain a feature authentication result corresponding to the at least two types of sample feature information; adjusting a model parameter of the second initial authentication model based on the feature authentication result corresponding to the at least two types of sample feature information and the sample authentication result corresponding to the at least two types of sample feature information until a difference between the feature authentication result obtained through feature authentication based on the at least two types of sample feature information and the sample authentication result corresponding to the at least two types of sample feature information meets a preset condition; and determining an authentication model that meets the preset condition as the biometric authentication model corresponding to the at least two types of biometric feature information.

According to the device enabling solution provided in this embodiment of this disclosure, the comprehensive biometric authentication model corresponding to the at least two types of biometric feature information is trained, so that biometric authentication can be performed based on the at least two types of biometric feature information and the comprehensive biometric authentication model.

Optionally, the at least two types of biometric feature information include at least two types of ear canal feature information, auricle feature information, vibration feature information, voiceprint feature information, facial feature information, fingerprint feature information, and iris feature information; and the vibration feature information is vibration information of a part on which the wearable device is worn.

According to a second aspect, a device enabling apparatus is provided. The device enabling apparatus includes modules configured to perform the device enabling method provided in the first aspect or any one of the optional manners of the first aspect.

According to a third aspect, a device enabling apparatus is provided. The device enabling apparatus includes a processor and a memory, the memory stores a program, and the processor is configured to invoke the program stored in the memory, so that the device enabling apparatus is enabled to perform the device enabling method provided in the first aspect or any one of the optional manners of the first aspect.

According to a fourth aspect, a computer-readable storage medium is provided. The computer-readable storage medium stores a computer program. When the computer program runs on a computer, the computer is enabled to perform the device enabling method provided in the first aspect or any one of the optional manners of the first aspect.

According to a fifth aspect, a computer program product including instructions is provided. When the computer program product runs on a computer, the computer is enabled to perform the device enabling method provided in the first aspect or any one of the optional manners of the first aspect.

According to a sixth aspect, a chip is provided. The chip includes a programmable logic circuit and/or program instructions. When the chip runs, the chip is configured to implement the device enabling method provided in the first aspect or any one of the optional manners of the first aspect.

According to a seventh aspect, a device enabling system is provided. The device enabling system includes at least one of a wearable device and a smart device, and the at least one of the wearable device and the smart device includes the device enabling apparatus provided in the second aspect or the third aspect.

Optionally, the wearable device includes either of a smart headset or smart glasses.

The technical solutions provided in embodiments of this disclosure have the following beneficial effects:

According to the technical solution provided in this embodiment of this disclosure, after collecting at least two types of biometric feature information of a user, the device enabling system performs identity authentication on the user based on the at least two types of biometric feature information; and if identity authentication succeeds, enables at least one of the wearable device and the smart device. Because the device enabling system performs identity authentication on the user based on the at least two types of biometric feature information, information security of a device is ensured.

DESCRIPTION OF EMBODIMENTS

To make the principles, technical solutions, and advantages of this disclosure clearer, the following further describes implementations of this disclosure in detail with reference to the accompanying drawings.

To ensure information security of a smart device, when a user uses the smart device, the smart device needs to perform identity authentication on the user, and the smart device is enabled after identity authentication succeeds. For example, after identity authentication succeeds, the smart device is woken up, unlocked, or enabled to perform some operations (for example, a payment operation). In a current device enabling solution, a single manner such as a character password, a pattern password, or voice is mainly used to perform identity authentication on the user. Consequently, information security of the device is poor.

In view of this, embodiments of this disclosure provide a device enabling solution. In the device enabling solution, identity authentication may be performed on the user based on at least two types of biometric feature information, to ensure information security of the device. The device enabling solution may be applied to a device enabling system. The device enabling system may include at least one of a wearable device and a smart device. In embodiments of this disclosure, an example in which the device enabling system includes the wearable device and the smart device is used for description.

Figure 1:
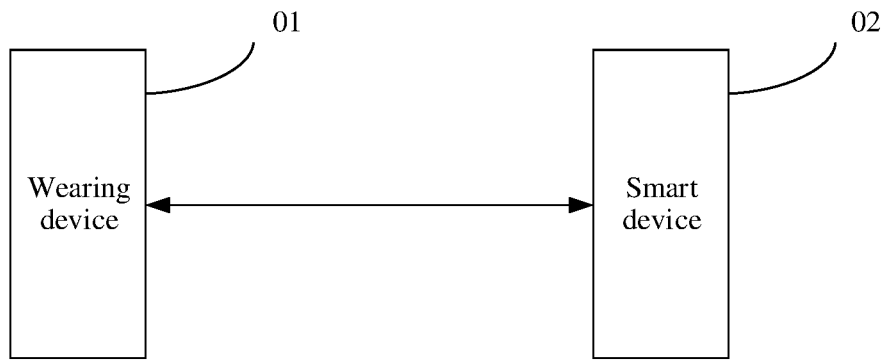
FIG. 1 is a schematic diagram of a device enabling system according to an embodiment of this disclosure.

For example, FIG. 1 is a schematic diagram of a device enabling system according to an embodiment of this disclosure. The device enabling system includes a wearable device 01 and a smart device 02. The wearable device 01 may be connected to the smart device 02 via a wired network or a wireless network. The wireless network may include but is not limited to a wireless fidelity (Wi-Fi) network, a Bluetooth network, an infrared network, and a Zigbee network. The wired network may include but is not limited to a universal serial bus (USB) network.

The wearable device 01 may include but is not limited to a smart headset, smart glasses, a smart band, a smart watch, smart shoes, smart clothes, a smart hat, a wearable virtual reality (VR) device, a wearable augmented reality (AR) device, and the like. The smart device 02 may include but is not limited to a smartphone, a tablet computer, a notebook computer, a desktop computer, a television set, a moving picture experts group audio layer-3 (MP3) player, a moving picture experts group audio layer-4 (MP4) player, an e-book reader, a smart home device, and the like. Optionally, the smart device 02 may alternatively be a wearable device, or the smart device 02 may alternatively be a host device of the wearable device 01. This is not limited in this embodiment of this disclosure.

In this embodiment of this disclosure, the wearable device 01 and/or the smart device 02 may collect at least two types of biometric feature information of a user, and perform identity authentication on the user based on the at least two types of biometric feature information. The wearable device 01 and/or the smart device 02 are/is enabled after identity authentication succeeds. Optionally, the wearable device 01 and/or the smart device 02 are/is enabled after the wearable device 01 performs identity authentication on the user; or the wearable device 01 and/or the smart device 02 are/is enabled after the smart device 02 performs identity authentication on the user. This is not limited in this embodiment of this disclosure. Optionally, an application (APP) may be installed in the smart device 02. Enabling the smart device 02 in this embodiment of this disclosure may mean enabling the smart device 02 (for example, waking up the smart device 02 or unlocking the smart device 02) or enabling the APP installed in the smart device 02 (for example, performing payment by using the APP). The APP installed in the smart device 02 may include but is not limited to a playback application, a call application, a navigation application, a payment application, a social application, and the like.

In this embodiment of this disclosure, based on different biometric feature information, the at least two types of biometric feature information used for identity authentication may be collected by the wearable device 01 or the smart device 02; or one portion of the at least two types of biometric feature information is collected by the wearable device 01, and the other portion is collected by the smart device 02. Optionally, the at least two types of biometric feature information may include at least two types of ear canal feature information, auricle feature information, vibration feature information, voiceprint feature information, facial feature information, fingerprint feature information, and iris feature information. The vibration feature information is vibration information of a part on which the wearable device is worn. The ear canal feature information, the auricle feature information, the vibration feature information, and the voiceprint feature information may be collected by the wearable device 01; and the facial feature information, the fingerprint feature information, and the iris feature information may be collected by the smart device 02. Alternatively, the ear canal feature information, the vibration feature information, and the voiceprint feature information may be collected by the wearable device 01; and the auricle feature information, the facial feature information, the fingerprint feature information, and the iris feature information may be collected by the smart device 02. It may be understood that, that biometric feature information is collected by the wearable device 01 or the smart device 02 depends on whether a collection component used for collecting the biometric feature information is deployed in the wearable device 01 and the smart device 02. If the collection component is deployed in the wearable device 01, the biometric feature information may be collected by the wearable device 01. If the collection component is deployed in the smart device 02, the biometric feature information may be collected by the smart device 02. If the collection component is deployed in both the wearable device 01 and the smart device 02, the biometric feature information may be collected by the wearable device 01 or the smart device 02. This is not limited in this embodiment of this disclosure.

A person skilled in the art will understand that the device enabling system shown in FIG. 1 is merely used as an example, and is not intended to limit the technical solutions in this embodiment of this disclosure. In an implementation process, a quantity of wearable devices and a quantity of smart devices may be configured based on a requirement; or another device may be configured in the device enabling system. For example, the device enabling system may include a plurality of smart devices communicatively connected to the wearable device 01. The plurality of smart devices are all smartphones. Alternatively, some of the plurality of smart devices are smartphones, and some other smart devices are smart home devices. For another example, the device enabling system may include a plurality of wearable devices communicatively connected to the smart device 02. The plurality of wearable devices are all smart headsets. Alternatively, some of the plurality of wearable devices are smart headsets, and some other wearable devices are smart glasses. This is not limited in this embodiment of this disclosure.

The device enabling method provided in this embodiment of this disclosure may be applied to the foregoing device enabling system. The device enabling method may be performed by the wearable device or the smart device in the foregoing device enabling system; or some steps in the device enabling method are performed by the wearable device, and the other steps are performed by the smart device. The following describes the device enabling method with reference to the accompanying drawings.

Figure 2:
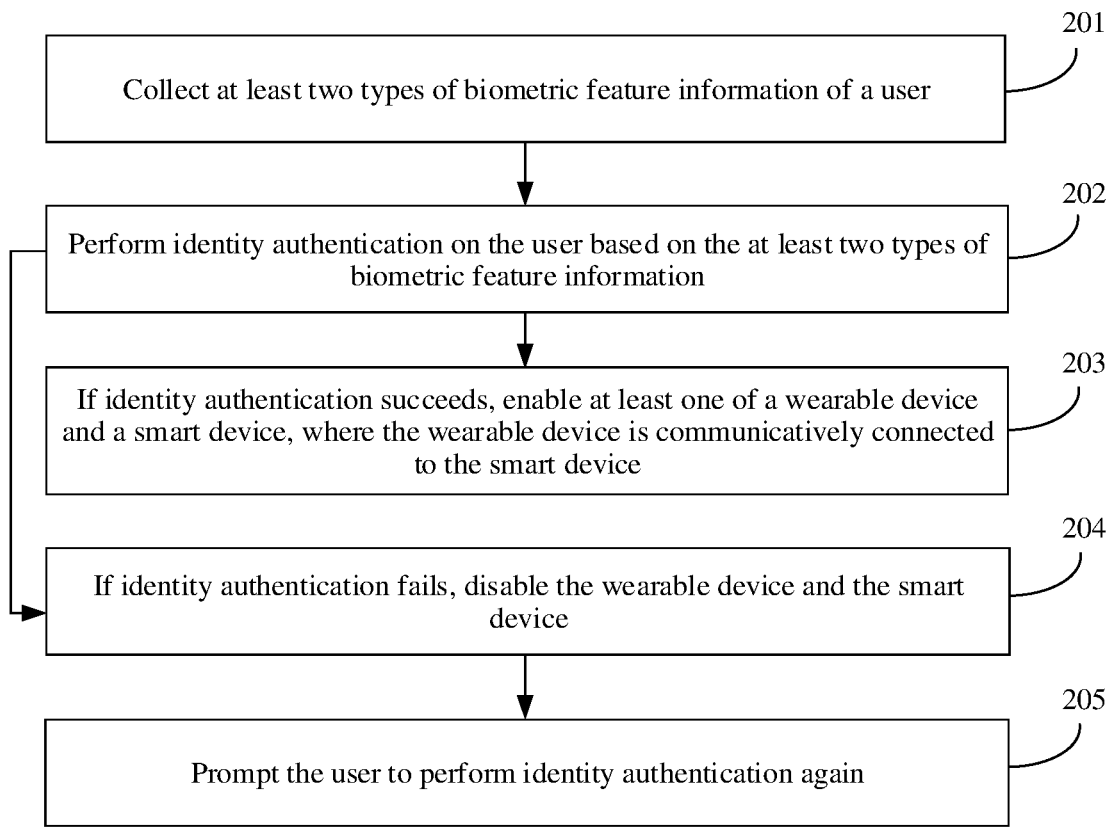
FIG. 2 is a method flowchart of a device enabling method according to an embodiment of this disclosure.

For example, FIG. 2 is a method flowchart of a device enabling method according to an embodiment of this disclosure. Refer to FIG. 2. The method may include the following steps.

Step 201: Collect at least two types of biometric feature information of a user.

The at least two types of biometric feature information may be collected by a wearable device or a smart device. Alternatively, some of the at least two types of biometric feature information are collected by the wearable device, and some other types are collected by the smart device. This is not limited in this embodiment of this disclosure. Optionally, the at least two types of biometric feature information may include at least two types of ear canal feature information, auricle feature information, vibration feature information, voiceprint feature information, facial feature information, fingerprint feature information, and iris feature information. The vibration feature information may be vibration information of a part on which the wearable device is worn. This embodiment of this disclosure is described by using an example in which the ear canal feature information, the auricle feature information, the vibration feature information, and the voiceprint feature information are collected by the wearable device; and the facial feature information, the fingerprint feature information, and the iris feature information are collected by the smart device.

Optionally, an ear canal feature collection component may be configured in the wearable device. When the wearable device is worn by the user, the ear canal feature collection component may face an ear canal of the user, and the wearable device may collect the ear canal feature information of the user by using the ear canal feature collection component. For example, the ear canal feature collection component may be a microphone component. When the wearable device is worn by the user, the microphone component may face the ear canal of the user; and a sound signal (which may be a sound signal sent by the user or a sound signal played by the microphone component) is propagated in the ear canal of the user, and is reflected and/or absorbed by the ear canal (for example, one portion of the sound signal is absorbed by the ear canal, and the other portion is reflected by the ear canal). The microphone component may collect a sound signal reflected by the ear canal of the user, and determine the ear canal feature information of the user based on the sound signal reflected by the ear canal of the user. For another example, the ear canal feature collection component may be an ultrasonic sensor. When the wearable device is worn by the user, the ultrasonic sensor may face the ear canal of the user; and the ultrasonic sensor may collect the sound signal (for example, an ultrasonic signal) reflected by the ear canal of the user, and determine the ear canal feature information of the user based on the sound signal reflected by the ear canal of the user.

Optionally, an auricle feature collection component may be configured in the wearable device. When the wearable device is worn by the user, the auricle feature collection component may face an auricle of the user; and the wearable device may collect the auricle feature information of the user by using the auricle feature collection component. For example, the auricle feature collection component may be a camera component. When the wearable device is worn by the user, the camera component may face the auricle of the user; and the camera component may capture an auricle image of the user, and determine the auricle feature information of the user based on the auricle image of the user. Optionally, the camera component may capture an ear image of the user, determine the auricle image of the user based on the ear image of the user, and determine the auricle feature information of the user based on the auricle image of the user. Optionally, the camera component may include a depth of field camera and/or a red green blue (RGB) camera. The auricle image and the ear image may be three-dimensional (3D) images or two-dimensional (2D) images.

Optionally, a vibration feature collection component may be configured in the wearable device. When the wearable device is worn by the user, the vibration feature collection component may collect the vibration feature information of the part on which the wearable device is worn. Optionally, the vibration feature collection component may be a vibration sensor such as an inertial measurement unit (IMU) or a film sensor. For example, the wearable device may be a smart headset or smart glasses. The vibration feature information may be ear vibration information of the user when a mouth of the user wearing the wearable device moves (generally, mouth movement of the user causes ear vibration). For example, the vibration feature information may be ear vibration feature information of the user when the user wearing the wearable device speaks. In this embodiment of this disclosure, the description "the user speaks" may mean that the user speaks and makes sound, or may mean that the user speaks but does not make sound (in other words, the user has only mouth movement, for example, the user opens the mouth, closes the mouth, or changes a mouth shape). This is not limited in this embodiment of this disclosure.

Optionally, a voiceprint feature collection component may be configured in the wearable device, and the wearable device may collect the voiceprint feature information of the user by using the voiceprint feature collection component. For example, the voiceprint feature collection component may be a microphone component. When the user wearing the wearable device makes sound (for example, makes sound when the user speaks), the microphone component may collect a sound signal of the user, and determine the voiceprint feature information of the user based on the sound signal of the user, for example, extract the voiceprint feature information from the sound signal.

Optionally, a facial feature collection component may be configured in the smart device, and the smart device may collect the facial feature information of the user by using the facial feature collection component. For example, the facial feature collection component may be a camera component. The camera component may capture a facial image of the user, and obtain the facial feature information based on the facial image.

Optionally, a fingerprint feature collection component may be configured in the smart device, and the smart device may collect the fingerprint feature information of the user by using the fingerprint feature collection component. For example, the fingerprint feature collection component may be a fingerprint sensor. The fingerprint sensor may be an optical sensor or an ultrasonic sensor. The optical sensor may collect an optical signal obtained through fingerprint reflection, and determine the fingerprint feature information of the user based on the optical signal obtained through fingerprint reflection. The ultrasonic sensor may collect an ultrasonic signal obtained through fingerprint reflection, and determine the fingerprint feature information of the user based on the ultrasonic signal obtained through fingerprint reflection.

Optionally, an iris feature collection component may be configured in the smart device, and the smart device may collect the iris feature information of the user by using the iris feature collection component. For example, the iris feature collection component may be a camera component. The camera component may capture an eye image of the user, and obtain the iris feature information based on the eye image.

A person skilled in the art will understand that the description of step 201 is merely an example. In an actual application, the biometric feature information may be all collected by the wearable device or the smart device. In addition, the description of the biometric feature information and a biometric feature information collection solution in step 201 is merely an example. The biometric feature information may further include information other than the foregoing described information, and the wearable device and/or the smart device may further collect the biometric feature information by using a solution other than the solution described in step 201. The biometric feature information, a manner of collecting the biometric feature information, and a collector of the biometric feature information are not limited in this embodiment of this disclosure.

Step 202: Perform identity authentication on the user based on the at least two types of biometric feature information.

Optionally, step 202 may be performed by the wearable device or the smart device. In this embodiment of this disclosure, an example in which step 202 is performed by the wearable device is used for description. For an implementation process in which the smart device performs step 202, refer to this step.

Figure 3:
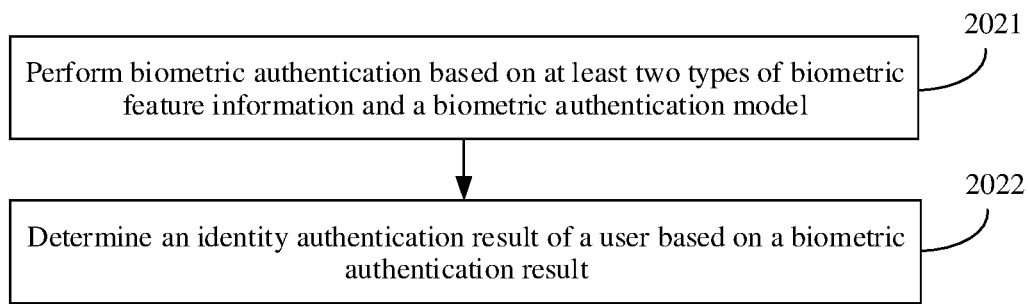
FIG. 3 is a flowchart of a user identity authentication method according to an embodiment of this disclosure.

In this embodiment of this disclosure, the wearable device may perform identity authentication on the user based on the at least two types of biometric feature information by using a machine learning algorithm. For example, FIG. 3 is a flowchart of a user identity authentication method according to an embodiment of this disclosure. Refer to FIG. 3. The method may include the following steps.

Sub-step 2021: Perform biometric authentication based on the at least two types of biometric feature information and a biometric authentication model.

In this embodiment of this disclosure, each type of the at least two types of biometric feature information may correspond to one biometric authentication model (in other words, each biometric authentication model is a single biometric authentication model corresponding to one type of biometric feature information); or the at least two types of biometric feature information correspond to one comprehensive biometric authentication model. Corresponding to the two cases, sub-step 2021 may include the following two possible implementations.

First implementation: Each type of the at least two types of biometric feature information corresponds to one biometric authentication model.

Each biometric authentication model is used to perform biometric authentication based on the corresponding biometric feature information. The wearable device may perform biometric authentication based on each type of biometric feature information and the corresponding biometric authentication model, to obtain a biometric authentication result corresponding to the biometric feature information. The biometric authentication result may be that biometric authentication succeeds or biometric authentication fails.

Optionally, an input parameter of the biometric authentication model corresponding to each type of biometric feature information may be the biometric feature information, and an output parameter of the biometric authentication model may be the biometric authentication result corresponding to the biometric feature information. For each type of biometric feature information, the wearable device may input the biometric feature information into the corresponding biometric authentication model, and the biometric authentication model outputs the biometric authentication result corresponding to the biometric feature information after performing calculation based on the biometric feature information.

Figure 4:
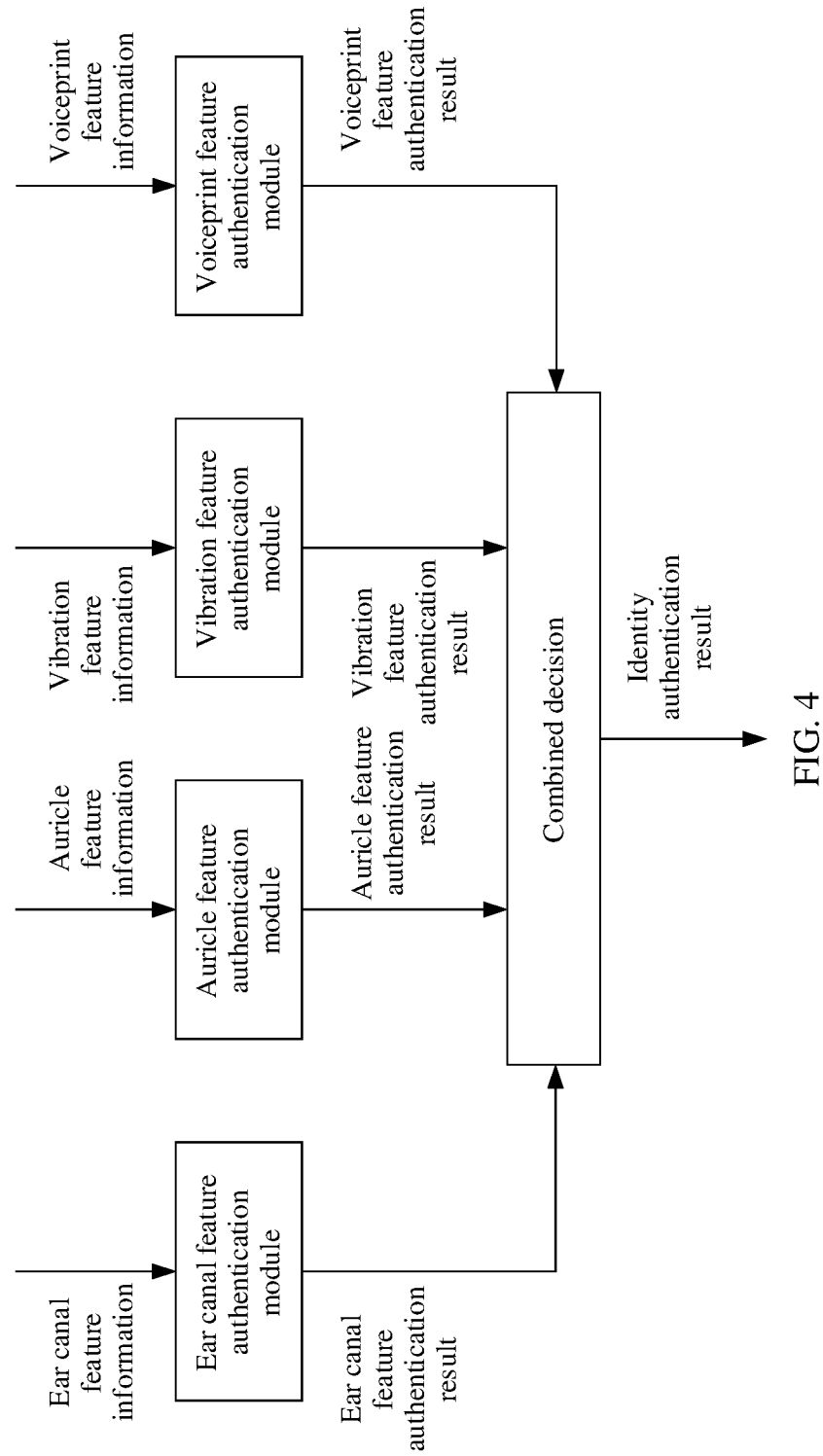
FIG. 4 is a schematic diagram of performing identity authentication on a user according to an embodiment of this disclosure.

For example, FIG. 4 is a schematic diagram of performing identity authentication on a user based on at least two types of biometric feature information according to an embodiment of this disclosure. FIG. 4 is described by using an example in which the at least two types of biometric feature information include the ear canal feature information, the auricle feature information, the vibration feature information, and the voiceprint feature information. A biometric authentication model corresponding to the ear canal feature information may be referred to as an ear canal feature authentication model, a biometric authentication model corresponding to the auricle feature information may be referred to as an auricle feature authentication model, a biometric authentication model corresponding to the vibration feature information may be referred to as a vibration feature authentication model, and a biometric authentication model corresponding to the voiceprint feature information may be referred to as a voiceprint feature authentication model. The wearable device may input the ear canal feature information into the ear canal feature authentication model, and the ear canal feature authentication model outputs a biometric authentication result corresponding to the ear canal feature information after performing calculation based on the ear canal feature information. The wearable device may input the auricle feature information into the auricle feature authentication model, and the auricle authentication model outputs a biometric authentication result corresponding to the auricle feature information after performing calculation based on the auricle feature information. The wearable device may input the vibration feature information into the vibration feature authentication model, and the vibration feature authentication model outputs a biometric authentication result corresponding to the vibration feature information after performing calculation based on the vibration feature information. The wearable device may input the voiceprint feature information into the voiceprint feature authentication model, and the voiceprint feature authentication model outputs a biometric authentication result corresponding to the voiceprint feature information after performing calculation based on the voiceprint feature information.

In this embodiment of this disclosure, the biometric authentication model corresponding to each type of biometric feature information may store preset feature information corresponding to the biometric feature information; and the biometric feature information and the preset feature information are a same type of feature information (for example, both are ear canal feature information). Each biometric authentication model may output the biometric authentication result after performing calculation based on the input biometric feature information and the preset feature information that is stored in the biometric authentication model. Alternatively, input parameters of the biometric authentication model corresponding to each type of biometric feature information may include the biometric feature information and the preset feature information corresponding to the biometric feature information. The biometric feature information and the preset feature information are the same type of feature information. Each biometric authentication model may output the biometric authentication result after performing calculation based on the input biometric feature information and the input preset feature information. This is not limited in this embodiment of this disclosure. The preset feature information may be registered with the wearable device when the user uses the wearable device for the first time. For example, the ear canal feature authentication model is used as an example. The ear canal feature authentication model may store preset ear canal feature information. The ear canal feature authentication model may output an ear canal feature authentication result after performing calculation based on the input ear canal feature information and the preset ear canal feature information that is stored in the ear canal feature authentication model. Alternatively, input parameters of the ear canal feature authentication model may include the collected ear canal feature information and the preset ear canal feature information. The ear canal feature authentication model may output the ear canal feature authentication result after performing calculation based on the input ear canal feature information and the input preset ear canal feature information.

Second implementation: The at least two types of biometric feature information correspond to one comprehensive biometric authentication model.

The comprehensive biometric authentication model is used to perform biometric authentication based on the at least two types of biometric feature information. The wearable device may perform biometric authentication based on the at least two types of biometric feature information and the comprehensive biometric authentication model, to obtain a biometric authentication result corresponding to the at least two types of biometric feature information. It is to be understood that in the second implementation, the at least two types of biometric feature information correspond to one biometric authentication result, and the biometric authentication result may be that biometric authentication succeeds or biometric authentication fails.

Optionally, an input parameter of the comprehensive biometric authentication model may be the at least two types of biometric feature information, and an output parameter may be the biometric authentication result corresponding to the at least two types of biometric feature information. The wearable device may input the at least two types of biometric feature information into the comprehensive biometric authentication model, and the comprehensive biometric authentication model outputs the biometric authentication result corresponding to the at least two types of biometric feature information after performing calculation based on the at least two types of biometric feature information.

Figure 5:
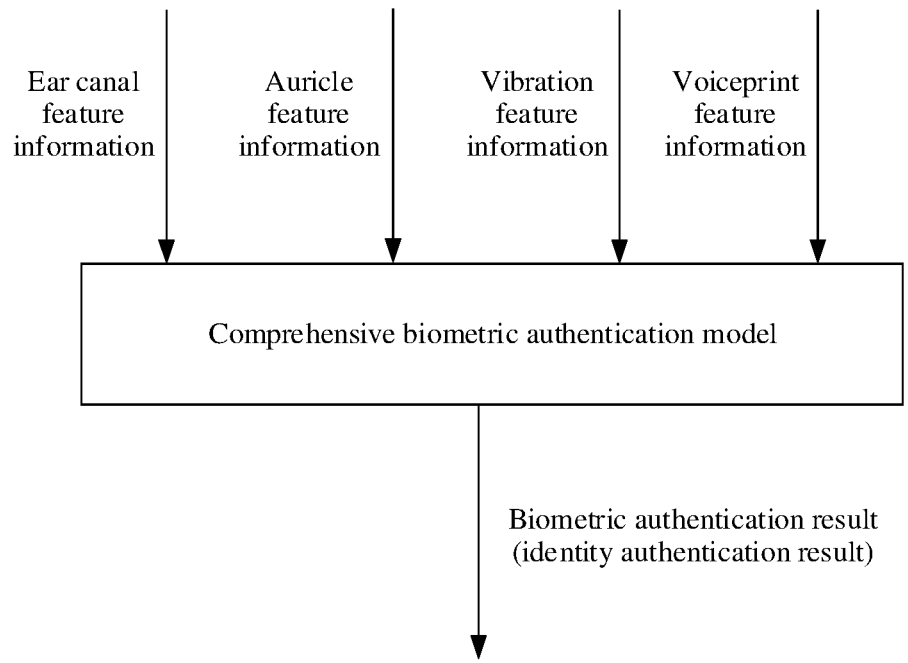
FIG. 5 is another schematic diagram of performing identity authentication on a user according to an embodiment of this disclosure.

For example, FIG. 5 is another schematic diagram of performing identity authentication on a user based on at least two types of biometric feature information according to an embodiment of this disclosure. FIG. 5 is described by using an example in which the at least two types of biometric feature information include the ear canal feature information, the auricle feature information, the vibration feature information, and the voiceprint feature information; and the ear canal feature information, the auricle feature information, the vibration feature information, and the voiceprint feature information correspond to one comprehensive biometric authentication model. The wearable device may input the ear canal feature information, the auricle feature information, the vibration feature information, and the voiceprint feature information into the comprehensive biometric authentication model. The comprehensive biometric authentication model outputs one biometric authentication result corresponding to the ear canal feature information, the auricle feature information, the vibration feature information, and the voiceprint feature information after performing calculation based on the ear canal feature information, the auricle feature information, the vibration feature information, and the voiceprint feature information.

In this embodiment of this disclosure, the comprehensive biometric authentication model corresponding to the at least two types of biometric feature information may store at least two types of preset feature information corresponding to the at least two types of biometric feature information (for example, the at least two types of preset feature information one-to-one correspond to the at least two types of biometric feature information); and each type of biometric feature information and the corresponding preset feature information are a same type of feature information. The comprehensive biometric authentication model may output the biometric authentication result after performing calculation based on the input at least two types of biometric feature information and the at least two types of preset feature information stored in the biometric authentication model. Alternatively, input parameters of the comprehensive biometric authentication model corresponding to the at least two types of biometric feature information may include the at least two types of biometric feature information and the at least two types of preset feature information corresponding to the at least two types of biometric feature information. The comprehensive biometric authentication model may output the biometric authentication result after performing calculation based on the input at least two types of biometric feature information and the input at least two types of preset feature information. This is not limited in this embodiment of this disclosure. Each type of preset feature information may be registered with the wearable device when the user uses the wearable device for the first time.

For example, the comprehensive biometric authentication model may store preset ear canal feature information, preset auricle feature information, preset vibration feature information, and preset voiceprint feature information. The comprehensive biometric authentication model may output the biometric authentication result after performing calculation based on the input ear canal feature information, the input auricle feature information, the input vibration feature information, and the input voiceprint feature information; and the preset ear canal feature information, the preset auricle feature information, the preset vibration feature information, and the preset voiceprint feature information that are stored in the comprehensive biometric authentication model. Alternatively, the input parameters of the comprehensive biometric authentication model may include the collected ear canal feature information, auricle feature information, vibration feature information, and voiceprint feature information; and the preset ear canal feature information, the preset auricle feature information, the preset vibration feature information, and the preset voiceprint feature information. The comprehensive biometric authentication model may output the biometric authentication result after performing calculation based on the input ear canal feature information, auricle feature information, vibration feature information, and voiceprint feature information; and the input preset ear canal feature information, preset auricle feature information, preset vibration feature information, and preset voiceprint feature information.

A person skilled in the art will understand that the foregoing two implementations are described by using an example in which the output parameter of the biometric authentication model is the biometric authentication result. In an actual application, the output parameter of the biometric authentication model may be authentication information that indicates the biometric authentication result. For example, the authentication information may be "yes" or "no", where "yes" indicates that biometric authentication succeeds, and "no" indicates that biometric authentication fails; or the authentication information may be "1" or "0", where "1" indicates that biometric authentication succeeds, and "0" indicates that biometric authentication fails. This is not limited in this embodiment of this disclosure.

Sub-step 2022: Determine an identity authentication result of the user based on the biometric authentication result.

Optionally, sub-step 2022 may include the following two possible implementations.

First implementation (corresponding to the first implementation in sub-step 2021): The identity authentication result of the user is determined based on biometric authentication results corresponding to the at least two types of biometric feature information. In other words, a combined decision is made on the biometric authentication results corresponding to the at least two types of biometric feature information, and a result obtained through the combined decision is determined as the identity authentication result of the user.

Optionally, the first implementation may include any one of the following four implementations:

(1) If a biometric authentication result corresponding to any one of the at least two types of biometric feature information indicates that biometric authentication succeeds, it is determined that identity authentication on the user succeeds.

For example, if a biometric authentication result corresponding to any one of the ear canal feature information, the auricle feature information, the vibration feature information, and the voiceprint feature information indicates that biometric authentication succeeds, the wearable device determines that identity authentication on the user succeeds.

For example, if a biometric authentication result corresponding to the ear canal feature information indicates that biometric authentication succeeds, and a biometric authentication result corresponding to the auricle feature information, a biometric authentication result corresponding to the vibration feature information, and a biometric authentication result corresponding to the voiceprint feature information all indicate that biometric authentication fails, the wearable device determines that identity authentication on the user succeeds.

For another example, if the biometric authentication result corresponding to the auricle feature information indicates that biometric authentication succeeds, and the biometric authentication result corresponding to the ear canal feature information, the biometric authentication result corresponding to the vibration feature information, and the biometric authentication result corresponding to the voiceprint feature information all indicate that biometric authentication fails, the wearable device determines that identity authentication on the user succeeds.

(2) If biometric authentication results corresponding to at least two types of biometric feature information in the at least two types of biometric feature information all indicate that biometric authentication succeeds, it is determined that identity authentication on the user succeeds.

For example, if biometric authentication results corresponding to at least two types of biometric feature information in the ear canal feature information, the auricle feature information, the vibration feature information, and the voiceprint feature information all indicate that biometric authentication succeeds, the wearable device determines that identity authentication on the user succeeds.

For example, if the biometric authentication result corresponding to the ear canal feature information and the biometric authentication result corresponding to the auricle feature information all indicate that biometric authentication succeeds, and the biometric authentication result corresponding to the vibration feature information and the biometric authentication result corresponding to the voiceprint feature information all indicate that biometric authentication fails, the wearable device determines that identity authentication on the user succeeds.

For another example, if the biometric authentication result corresponding to the ear canal feature information, the biometric authentication result corresponding to the auricle feature information, and the biometric authentication result corresponding to the vibration feature information all indicate that biometric authentication succeeds, and the biometric authentication result corresponding to the voiceprint feature information indicates that biometric authentication fails, the wearable device determines that identity authentication on the user succeeds.

(3) If biometric authentication results corresponding to all biometric feature information in the at least two types of biometric feature information all indicate that biometric authentication succeeds, it is determined that identity authentication on the user succeeds.

For example, if the biometric authentication result corresponding to the ear canal feature information, the biometric authentication result corresponding to the auricle feature information, the biometric authentication result corresponding to the vibration feature information, and the biometric authentication result corresponding to the voiceprint feature information all indicate that the biometric authentication succeeds, the wearable device determines that identity authentication on the user succeeds.

(4) Weighted calculation is performed on the biometric authentication results corresponding to the at least two types of biometric feature information, and the identity authentication result of the user is determined based on a result obtained through weighted calculation.

A sum of weights corresponding to the at least two types of biometric feature information may be 1, and a weight corresponding to each type of biometric feature information may be set and adjusted based on an actual situation.

For example, the wearable device may perform weighted calculation on the biometric authentication result corresponding to the ear canal feature information, the biometric authentication result corresponding to the auricle feature information, the biometric authentication result corresponding to the vibration feature information, and the biometric authentication result corresponding to the voiceprint feature information according to a decision formula: $y=a*x_1+b*x_2+c*x_3+d*x_4$; and determine a result obtained through weighted calculation as the identity authentication result of the user. $x_1$, $x_2$, $x_3$, and $x_4$ sequentially represent the biometric authentication result corresponding to the ear canal feature information, the biometric authentication result corresponding to the auricle feature information, the biometric authentication result corresponding to the vibration feature information, and the biometric authentication result corresponding to the voiceprint feature information; a, b, c and d sequentially represent a weight of the ear canal feature information, a weight of the auricle feature information, a weight of the vibration feature information, and a weight of the voiceprint feature information; $a+b+c+d=1$; and y represents the result obtained through weighted calculation.

A person skilled in the art will understand that, in the foregoing implementations (1) to (4), a success rate of identity authentication in implementation (1) is the highest, security of identity authentication in implementation (3) is the highest, both a success rate and security of identity authentication in implementation (2) are between those of implementation (1) and implementation (3), flexibility of identity authentication in implementation (4) is high. By setting the weights corresponding to different biometric feature information in implementation (4), the success rate and security may be balanced in the final identity authentication result.

Second implementation (corresponding to the second implementation in sub-step 2021): The biometric authentication result corresponding to the at least two types of biometric feature information is determined as the identity authentication result of the user.

In the second implementation of sub-step 2021, one biometric authentication result corresponding to the at least two types of biometric feature information may be determined. Therefore, in the second implementation of sub-step 2022, the wearable device may determine the biometric authentication result corresponding to the at least two types of biometric feature information as the identity authentication result of the user.

For example, as shown in FIG. 5, the biometric authentication result output by the comprehensive biometric authentication model is the identity authentication result. The wearable device determines, as the identity authentication result of the user, one biometric authentication result corresponding to the ear canal feature information, the auricle feature information, the vibration feature information, and the voiceprint feature information.

A person skilled in the art will understand, by comparing the first implementation with the second implementation, that in the first implementation, the identity authentication result is determined by a final decision of performing biometric authentication made by the wearable device. In the second implementation, because the biometric authentication result output by the biometric authentication model is the identity authentication result, it may be considered that the identity authentication result is determined based on a final decision of performing biometric authentication made by the biometric authentication model. In the second implementation, it may be considered that a decision function of biometric authentication is transplanted to the biometric authentication model. Optionally, the device enabling system provided in this embodiment of this disclosure may further include a cloud device (for example, a server), and the final decision of performing biometric authentication may also be performed by the cloud device. This is not limited in this embodiment of this disclosure.

A person skilled in the art will understand that the solution in which the wearable device performs identity authentication on the user described in step 202 is merely an example. In an actual application, the wearable device may perform identity authentication on the user by using a solution other than the solution described in step 202. For example, the wearable device may store the preset feature information corresponding to the at least two types of biometric feature information, and the wearable device may match and compare each type of biometric feature information with the corresponding preset feature information to perform identity authentication on the user. If the at least two types of biometric feature information match the corresponding preset feature information, the wearable device determines that identity authentication succeeds; and if at least one of the at least two types of biometric feature information does not match the corresponding preset feature information, the wearable device determines that identity authentication fails.

Step 203: If identity authentication succeeds, enable at least one of the wearable device and the smart device, where the wearable device is communicatively connected to the smart device.

Optionally, step 203 may be performed by the wearable device or the smart device. In this embodiment of this disclosure, an example in which step 203 is performed by the wearable device is used for description. For an implementation process in which the smart device performs step 203, refer to this step.

If identity authentication performed by the wearable device on the user succeeds in step 203, the wearable device may enable at least one of the wearable device and the smart device. Optionally, the wearable device may send an enabling signal to the smart device through a communication connection between the wearable device and the smart device, to enable the smart device.

Optionally, for example, that the wearable device enables the wearable device may be that the wearable device wakes up the wearable device; or when the wearable device is a smart headset, the wearable device controls the wearable device to enter a normal working state, adjusts playback volume, or the like. For example, that the wearable device enables the smart device may be that the wearable device wakes up the smart device, the wearable device triggers the smart device to perform a payment operation, or the wearable device controls the smart device to start playing a song. This is not limited in this embodiment of this disclosure.

Step 204: If identity authentication fails, disable the wearable device and the smart device.

If identity authentication on the user fails, the wearable device does not enable the wearable device and the smart device. For example, the wearable device does not wake up the wearable device and the smart device.

Step 205: Prompt the user to perform identity authentication again.

If identity authentication performed by the wearable device on the user fails, the wearable device and/or the smart device may prompt the user to perform identity authentication again. For example, the wearable device has an audio component, and the wearable device may control the audio component to make prompt sound to prompt the user to perform identity authentication again; or the wearable device has a prompt light, and the wearable device may control the prompt light to emit light or blink to prompt the user to perform identity authentication again. For another example, the smart device may generate prompt information, and display or broadcast the prompt information to prompt the user to perform identity authentication again. This is not limited in this embodiment of this disclosure.

In conclusion, according to the device enabling method provided in this embodiment of this disclosure, the device enabling system may collect the at least two types of biometric feature information of the user, perform identity authentication on the user based on the at least two types of biometric feature information, and enable at least one of the wearable device and the smart device if identity authentication succeeds. Because the device enabling system performs identity authentication on the user based on the at least two types of biometric feature information, information security of the device is ensured.

Optionally, before step 202, the device enabling system may obtain the biometric authentication model. In this embodiment of this disclosure, the biometric authentication model may be trained by the smart device or the wearable device in the device enabling system, or may be sent by a device (for example, the cloud device) outside the device enabling system. To be specific, the biometric authentication model is sent to the device enabling system after being trained by the device outside the device enabling system.

In this embodiment of this disclosure, an example in which the biometric authentication model is trained by the smart device in the device enabling system is used for description. Before step 202, the device enabling method may further include: performing training based on sample data to generate the biometric authentication model. As described above, in this embodiment of this disclosure, each type of biometric feature information may correspond to one biometric authentication model, or the at least two types of biometric feature information correspond to one comprehensive biometric authentication model. Based on whether the biometric authentication model corresponds to one type of biometric feature information or corresponds to the at least two types of biometric feature information, the performing training based on sample data to generate the biometric authentication model may include the following two possible cases.

Case 1: Each type of biometric feature information corresponds to one biometric authentication model, the sample data includes at least two types of sample feature information and sample authentication results corresponding to the at least two types of sample feature information, and each type of sample feature information is one type of biometric feature information. A training process of the biometric authentication model corresponding to each type of biometric feature information may be shown in FIG. 6.

Figure 6:
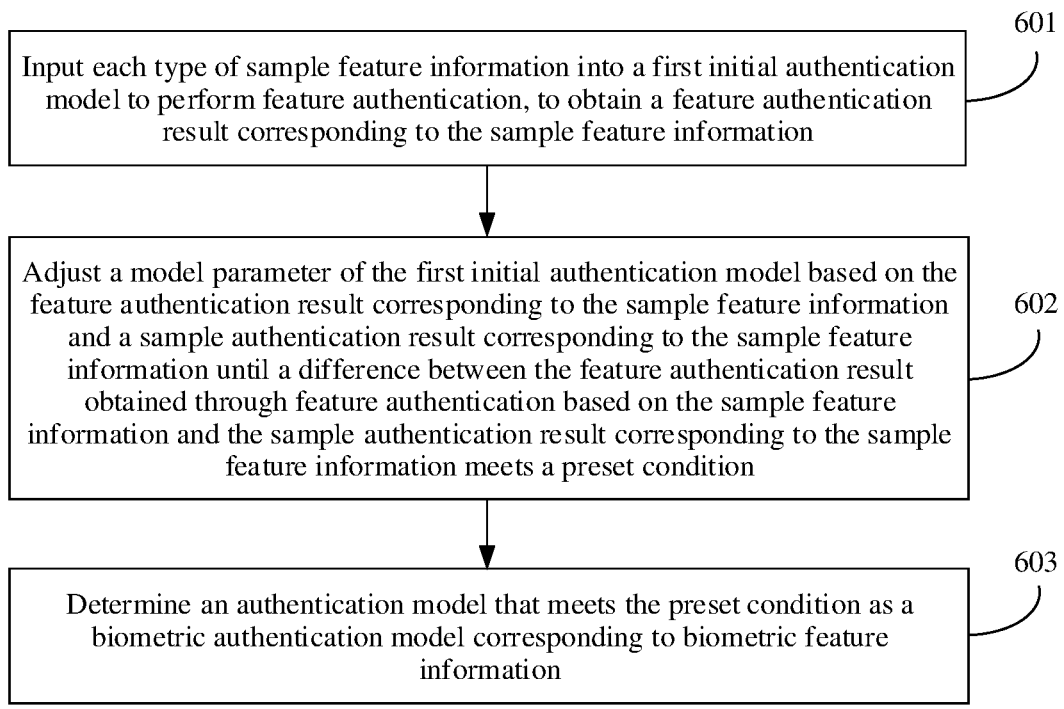
FIG. 6 is a flowchart of a biometric authentication model training method according to an embodiment of this disclosure.

For example, FIG. 6 is a flowchart of a biometric authentication model training method according to an embodiment of this disclosure. Refer to FIG. 6. The method may include the following steps.

Step 601: Input each type of sample feature information into a first initial authentication model to perform feature authentication, to obtain a feature authentication result corresponding to the sample feature information.

The smart device may obtain the first initial authentication model. For each type of sample feature information, the smart device may input the sample feature information into the first initial authentication model; perform feature authentication based on the sample feature information by using the first initial authentication model; and determine an output result that is obtained through authentication performed by the first initial authentication model based on the sample feature information as the feature authentication result corresponding to the sample feature information. The first initial authentication model may belong to various currently-used artificial intelligence models such as a machine learning network model, a deep learning network model, or a shallow learning network model.

Step 602: Adjust a model parameter of the first initial authentication model based on the feature authentication result corresponding to the sample feature information and the sample authentication result corresponding to the sample feature information until a difference between the feature authentication result obtained through feature authentication based on the sample feature information and the sample authentication result corresponding to the sample feature information meets a preset condition.

After performing feature authentication on the sample feature information to obtain the feature authentication result, the smart device may adjust the model parameter of the first initial authentication model based on the feature authentication result corresponding to the sample feature information and the sample authentication result corresponding to the sample feature information. After adjusting the model parameter, the smart device inputs the sample feature information into an authentication model obtained after the model parameter is adjusted to perform feature authentication again, to obtain a feature authentication result through re-authentication. Based on the feature authentication result obtained through re-authentication and the sample authentication result corresponding to the sample feature information, after adjusting the model parameter again, the smart device performs feature authentication again based on the sample feature information. The foregoing process from adjusting the model parameter to inputting the sample feature information is repeated to perform model training until the difference between the feature authentication result obtained through feature authentication based on the sample feature information and the sample authentication result corresponding to the sample feature information meets the preset condition. The preset condition may be a condition representing a small difference between the feature authentication result and the sample authentication result. For example, the preset condition may be that the feature authentication result is the same as the sample authentication result. This is not limited in this embodiment of this disclosure.

Step 603: Determine an authentication model that meets the preset condition as the biometric authentication model corresponding to the biometric feature information.

After performing step 602, the smart device may obtain an authentication model whose difference between the feature authentication result and the sample authentication result meets the preset condition. The smart device may determine the authentication model whose difference between the feature authentication result and the sample authentication result meets the preset condition as the biometric authentication model corresponding to the corresponding biometric feature information.

A person skilled in the art will understand that FIG. 6 is described by using an example in which the biometric authentication model corresponding to one type of biometric feature information is trained. For a training process of the biometric authentication model corresponding to each type of biometric feature information, refer to FIG. 6. For example, for training processes of the ear canal feature authentication model, the auricle feature authentication model, the vibration feature authentication model, and the voiceprint feature authentication model, refer to FIG. 6.

Case 2: The at least two types of biometric feature information correspond to one comprehensive biometric authentication model, the sample data includes at least two types of sample feature information and a sample authentication result corresponding to the at least two types of sample feature information, each type of sample feature information is one type of biometric feature information, and the sample authentication result corresponding to the at least two types of sample feature information may be one authentication result. A training process of the biometric authentication model corresponding to the at least two types of biometric feature information may be shown in FIG. 7.

Figure 7:
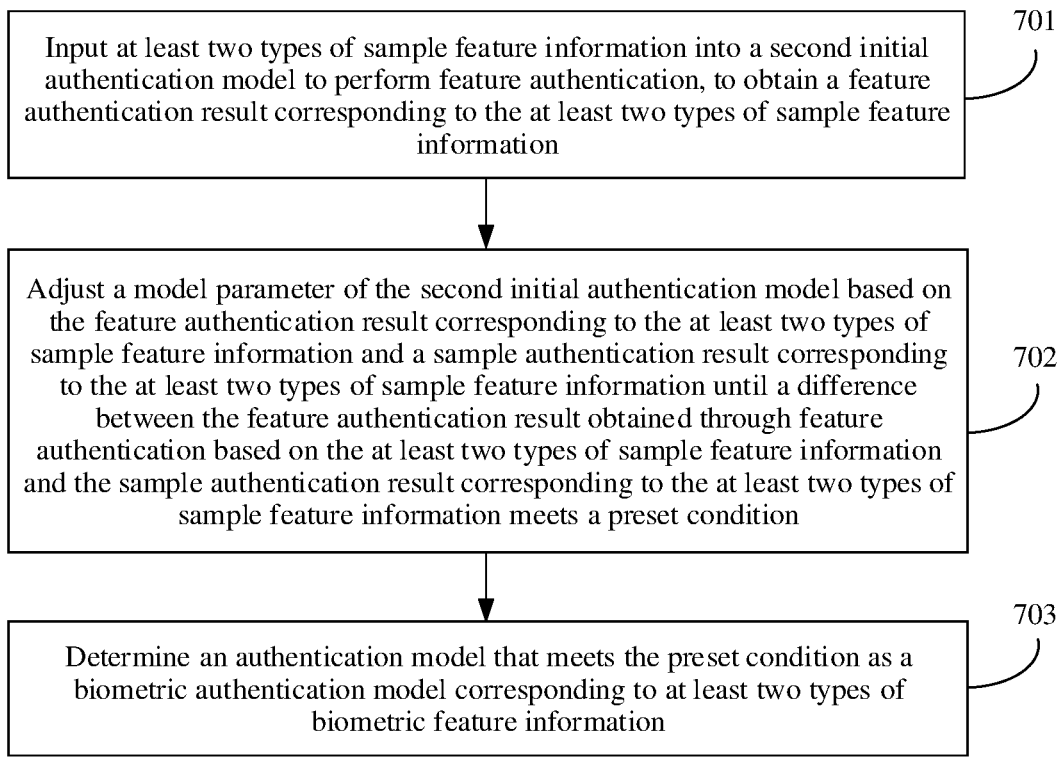
FIG. 7 is another flowchart of a biometric authentication model training method according to an embodiment of this disclosure.

For example, FIG. 7 is a flowchart of another biometric authentication model training method according to an embodiment of this disclosure. Refer to FIG. 7. The method may include the following steps.

Step 701: Input the at least two types of sample feature information into a second initial authentication model to perform feature authentication, to obtain a feature authentication result corresponding to the at least two types of sample feature information.

The smart device may obtain the second initial authentication model; input the at least two types of sample feature information into the second initial authentication model; perform feature authentication based on the at least two types of sample feature information by using the second initial authentication model; and determine an output result that is obtained through authentication performed by the second initial authentication model based on the at least two types of sample feature information as the feature authentication result corresponding to the at least two types of sample feature information. The feature authentication result corresponding to the at least two types of sample feature information may be one authentication result. The second initial authentication model may belong to various currently-used artificial intelligence models such as a machine learning network model, a deep learning network model, or a shallow learning network model.

Step 702: Adjust a model parameter of the second initial authentication model based on the feature authentication result corresponding to the at least two types of sample feature information and the sample authentication result corresponding to the at least two types of sample feature information until a difference between the feature authentication result obtained through feature authentication based on the at least two types of sample feature information and the sample authentication result corresponding to the at least two types of sample feature information meets a preset condition.

After performing feature authentication on the at least two types of sample feature information to obtain the feature authentication result, the smart device may adjust the model parameter of the second initial authentication model based on the feature authentication result corresponding to the at least two types of sample feature information and the sample authentication result corresponding to the at least two types of sample feature information. After adjusting the model parameter, the smart device inputs the at least two types of sample feature information into an authentication model obtained after the model parameter is adjusted to perform feature authentication again, to obtain a feature authentication result through re-authentication. Based on the feature authentication result obtained through re-authentication and the sample authentication result corresponding to the at least two types of sample feature information, after adjusting the model parameter again, the smart device performs feature authentication again based on the at least two types of sample feature information. The foregoing process from adjusting the model parameter to inputting the at least two types of sample feature information is repeated to perform model training until the difference between the feature authentication result obtained through feature authentication based on the at least two types of sample feature information and the sample authentication result corresponding to the at least two types of sample feature information meets the preset condition. The preset condition may be a condition representing a small difference between the feature authentication result and the sample authentication result. For example, the preset condition may be that the feature authentication result is the same as the sample authentication result. This is not limited in this embodiment of this disclosure.

Step 703: Determine an authentication model that meets the preset condition as the biometric authentication model corresponding to the at least two types of biometric feature information.

After performing step 702, the smart device may obtain an authentication model whose difference between the feature authentication result and the sample authentication result meets the preset condition. The smart device may determine the authentication model whose difference between the feature authentication result and the sample authentication result meets the preset condition as the biometric authentication model corresponding to the at least two types of biometric feature information. For example, the biometric authentication model corresponding to the at least two types of biometric feature information may be the comprehensive biometric authentication model shown in FIG. 5.

A person skilled in the art will understand that step 601 and step 602, and step 701 and step 702 are merely examples. In an actual application, a large amount of sample data may be used to train the biometric authentication model. In this way, authentication accuracy of the biometric authentication model obtained through training can be ensured. The embodiments shown in FIG. 6 and FIG. 7 are described by using an example in which the smart device trains the biometric authentication model. For a process in which the wearable device or the device outside the device enabling system trains the biometric authentication model, refer to the embodiments in FIG. 6 and FIG. 7. Details are not described herein again in embodiments of this disclosure.

The following provides apparatus embodiments of this disclosure that may be used to execute the method embodiments of this disclosure. For details not disclosed in the apparatus embodiments of this disclosure, refer to the method embodiments of this disclosure.

Figure 8:
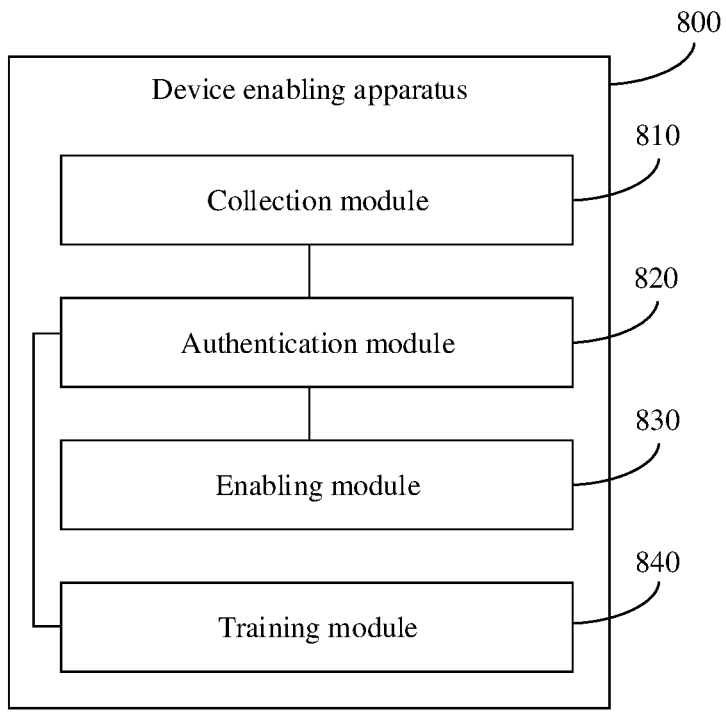
FIG. 8 is a schematic diagram of a logical structure of a device enabling apparatus according to an embodiment of this disclosure.

FIG. 8 is a schematic diagram of a logical structure of a device enabling apparatus 800 according to an embodiment of this disclosure. The device enabling apparatus 800 may be the wearable device 01 in the device enabling system shown in FIG. 1 or a functional component of the wearable device 01; or the device enabling apparatus 800 may be the smart device 02 in the device enabling system shown in FIG. 1 or a functional component in the smart device 02. Refer to FIG. 8. The device enabling apparatus 800 may include but is not limited to:

a collection module 810, configured to collect at least two types of biometric feature information of a user;

an authentication module 820, configured to perform identity authentication on the user based on the at least two types of biometric feature information; and an enabling module 830, configured to: if identity authentication succeeds, enable at least one of the wearable device and the smart device, where the wearable device is communicatively connected to the smart device.

Optionally, the authentication module 820 is configured to:

perform biometric authentication based on the at least two types of biometric feature information and a biometric authentication model; and determine an identity authentication result of the user based on a biometric authentication result.

Optionally, each type of the at least two types of biometric feature information corresponds to one biometric authentication model, and each biometric authentication model is used to perform biometric authentication based on the corresponding biometric feature information.

The authentication module 820 is configured to:

perform biometric authentication based on each type of biometric feature information and the corresponding biometric authentication model, to obtain a biometric authentication result corresponding to the biometric feature information; and determine the identity authentication result of the user based on biometric authentication results corresponding to the at least two types of biometric feature information.

Optionally, the authentication module 820 is configured to:

if a biometric authentication result corresponding to any one of the at least two types of biometric feature information indicates that biometric authentication succeeds, determine that identity authentication on the user succeeds;

if biometric authentication results corresponding to at least two types of biometric feature information in the at least two types of biometric feature information all indicate that biometric authentication succeeds, determine that identity authentication on the user succeeds;

if biometric authentication results corresponding to all biometric feature information in the at least two types of biometric feature information all indicate that biometric authentication succeeds, determine that identity authentication on the user succeeds; or perform weighted calculation on the biometric authentication results corresponding to the at least two types of biometric feature information, and determine the identity authentication result of the user based on a result obtained through weighted calculation.

Optionally, the at least two types of biometric feature information correspond to one comprehensive biometric authentication model.

The authentication module 820 is configured to:

perform biometric authentication based on the at least two types of biometric feature information and the biometric authentication model, to obtain a biometric authentication result corresponding to the at least two types of biometric feature information; and determine the biometric authentication result corresponding to the at least two types of biometric feature information as the identity authentication result of the user.

Optionally, still refer to FIG. 8. The device enabling apparatus 800 further includes:

a training module 840, configured to: before the authentication module 820 performs biometric authentication based on the at least two types of biometric feature information and the biometric authentication model, perform training based on sample data to generate the biometric authentication model.

Optionally, each of the at least two types of biometric feature information corresponds to one biometric authentication model; and the sample data includes at least two types of sample feature information and sample authentication results corresponding to the at least two types of sample feature information, and each type of sample feature information is one type of biometric feature information.

The training module 840 is configured to:

input each type of sample feature information into a first initial authentication model to perform feature authentication, to obtain a feature authentication result corresponding to the sample feature information;

adjust a model parameter of the first initial authentication model based on the feature authentication result corresponding to the sample feature information and the sample authentication result corresponding to the sample feature information until a difference between the feature authentication result obtained through feature authentication based on the sample feature information and the sample authentication result corresponding to the sample feature information meets a preset condition; and determine an authentication model that meets the preset condition as the biometric authentication model corresponding to the biometric feature information.

Optionally, the at least two types of biometric feature information correspond to one comprehensive biometric authentication model; and the sample data includes at least two types of sample feature information and a sample authentication result corresponding to the at least two types of sample feature information, and each type of sample feature information is one type of biometric feature information.

The training module 840 is configured to:

input the at least two types of sample feature information into a second initial authentication model to perform feature authentication, to obtain a feature authentication result corresponding to the at least two types of sample feature information;

adjust a model parameter of the second initial authentication model based on the feature authentication result corresponding to the at least two types of sample feature information and the sample authentication result corresponding to the at least two types of sample feature information until a difference between the feature authentication result obtained through feature authentication based on the at least two types of sample feature information and the sample authentication result corresponding to the at least two types of sample feature information meets a preset condition; and determine an authentication model that meets the preset condition as the biometric authentication model corresponding to the at least two types of biometric feature information.

Optionally, the at least two types of biometric feature information include at least two types of ear canal feature information, auricle feature information, vibration feature information, voiceprint feature information, facial feature information, fingerprint feature information, and iris feature information. The vibration feature information is vibration information of a part on which the wearable device is worn.

In conclusion, according to the device enabling apparatus provided in this embodiment of this disclosure, the collection module may collect the at least two types of biometric feature information of the user; the authentication module may perform identity authentication on the user based on the at least two types of biometric feature information; and the enabling module may enable at least one of the wearable device and the smart device if identity authentication succeeds. Because the authentication module performs identity authentication on the user based on the at least two types of biometric feature information, information security of the device is ensured.

It should be noted that, when the device enabling apparatus provided in the foregoing embodiment performs device enabling, division into the foregoing functional modules is merely used as an example for description. In an actual application, the foregoing functions may be allocated to different functional modules for implementation based on a requirement. In other words, an internal structure of the device enabling apparatus is divided into different functional modules, to complete all or some of the functions described above. In addition, the device enabling apparatus provided in the foregoing embodiment pertains to a same concept as the device enabling method embodiment. For a specific implementation process of the device enabling apparatus, refer to the method embodiment. Details are not described herein again.

Figure 9:
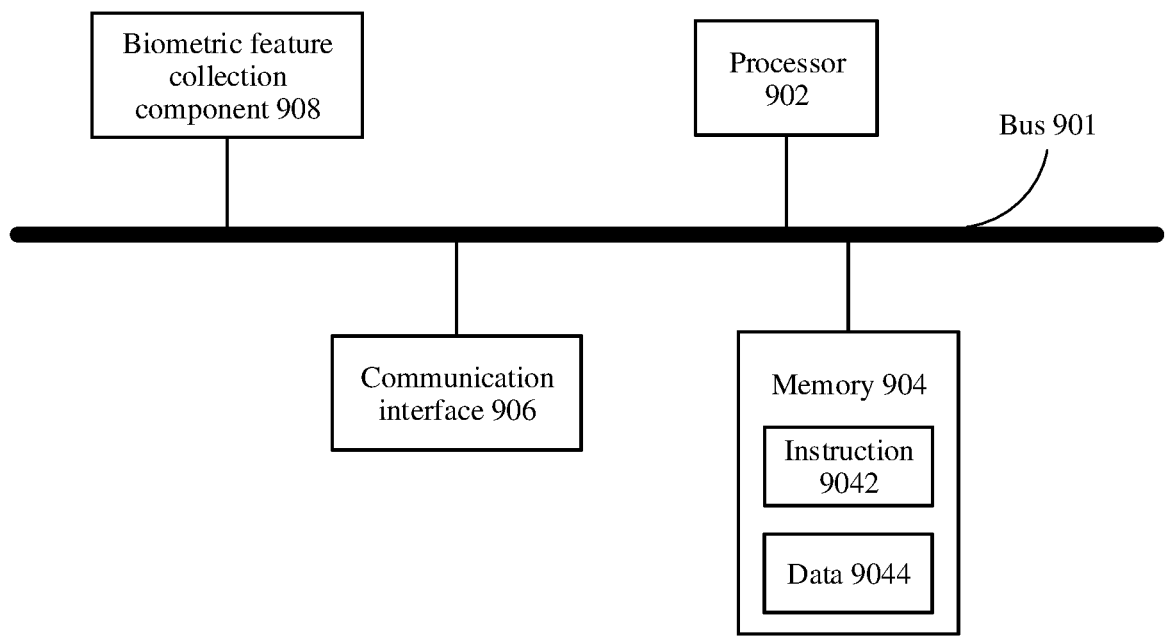
FIG. 9 is a schematic diagram of a hardware structure of a device enabling apparatus according to an embodiment of this disclosure.

FIG. 9 is a schematic diagram of a hardware structure of a device enabling apparatus 900 according to an embodiment of this disclosure. The device enabling apparatus 900 may be a wearable device or a smart device. Refer to FIG. 9. The device enabling apparatus 900 includes a processor 902, a memory 904, a communication interface 906, a biometric feature collection component 908, and a bus 910. The processor 902, the memory 904, the communication interface 906, and the biometric feature collection component 908 are communicatively connected to each other through the bus 910. A person skilled in the art should understand that a connection manner between the processor 902, the memory 904, the communication interface 906, and the biometric feature collection component 908 shown in FIG. 9 is merely an example. In an implementation process, the processor 902, the memory 904, the communication interface 906, and the biometric feature collection component 908 may be communicatively connected to each other in another connection manner other than through the bus 910.

The memory 904 may be configured to store an instruction 9042 and data 9044. In this embodiment of this disclosure, the memory 904 may be various types of storage media, for example, a random access memory (RAM), a read-only memory (ROM), a non-volatile RAM (NVRAM), a programmable ROM (PROM), an erasable PROM EPROM), an electrically erasable PROM (EEPROM), a flash memory, an optical memory, or a register. In addition, the memory 904 may include a hard disk and/or a memory.

The processor 902 may be a general-purpose processor or a dedicated processor. The general-purpose processor may be a processor that performs a specific step and/or operation by reading and executing instructions (for example, the instruction 9042) stored in a memory (for example, the memory 904). In a process of performing the foregoing step and/or operation, the general-purpose processor may use data (for example, the data 9044) stored in the memory (for example, the memory 904). The general-purpose processor may be, for example, but is not limited to, a central processing unit (CPU). The dedicated processor may be a specially-designed processor configured to perform a specific step and/or operation. For example, the dedicated processor may be, but is not limited to, a digital signal processor (DSP), an application-specific integrated circuit (ASIC), a field programmable gate array (FPGA) or a programmable logic array (PLA). In addition, the processor 902 may alternatively be a combination of a plurality of processors, for example, a multi-core processor. The processor 902 may include one or more circuits, to perform all or some of the steps of the device enabling method provided in the foregoing embodiments.

The communication interface 906 may include an input/output (I/O) interface, a physical interface, a logical interface, and the like that are used to implement interconnection of components inside the device enabling apparatus 900 and an interface configured to implement interconnection between the device enabling apparatus 900 and another device (for example, a network device or user equipment). The physical interface may be a gigabit Ethernet (GE) interface, and may be configured to implement the interconnection between the device enabling apparatus 900 and the another device (for example, the network device or the user equipment). The logical interface is an internal interface of the device enabling apparatus 900, and may be configured to implement the interconnection of the components inside the device enabling apparatus 900. It is to understood that the communication interface 906 may be used by the device enabling apparatus 900 to communicate with another wearable device and/or smart device. For example, the communication interface 906 is used by the device enabling apparatus 900 to send information to and receive information from the another smart device.

The biometric feature collection component 908 may be any component that can collect biometric feature information. The biometric feature collection component 908 may include, for example, but is not limited to an ear canal feature collection component configured to collect ear canal feature information, an auricle feature collection component configured to collect auricle feature information, a vibration feature collection component configured to collect vibration feature information, a voiceprint feature collection component configured to collect voiceprint feature information, a facial feature collection component configured to collect facial feature information, a fingerprint feature collection component configured to collect fingerprint feature information, and an iris feature collection component configured to collect iris feature information.

The bus 910 may be any type of communication bus configured to implement interconnection among the processor 902, the memory 904, the communication interface 906, and the biometric feature collection component 908. For example, the bus 910 may be a system bus.

The foregoing components may be separately disposed on chips that are independent of each other, or at least some or all of the components may be disposed on a same chip. Whether the components are separately disposed on different chips or are integrated and disposed on one or more chips usually depends on a specific requirement of product design. A specific implementation form of the foregoing components is not limited in this embodiment of this disclosure.

The device enabling apparatus 900 shown in FIG. 9 is merely an example. In an implementation process, the device enabling apparatus 900 may further include other components, which are not enumerated one by one in the embodiment shown in FIG. 9. The device enabling apparatus 900 shown in FIG. 9 may perform all or some steps of the device enabling method provided in the foregoing embodiments to enable a device.

Figure 10:
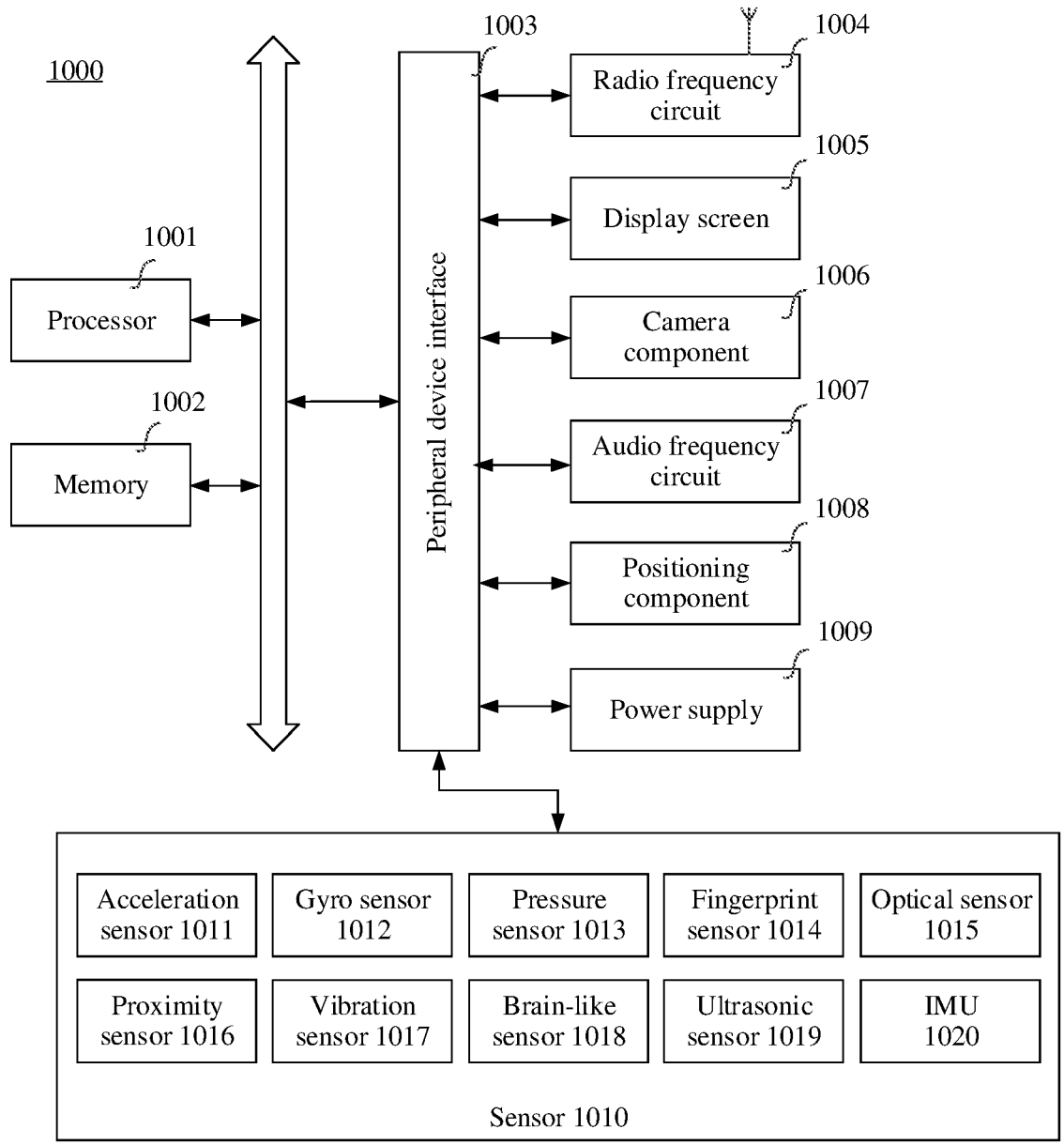
FIG. 10 is a schematic diagram of a hardware structure of another device enabling apparatus according to an embodiment of this disclosure.

For example, FIG. 10 is a schematic diagram of a hardware structure of another device enabling apparatus 1000 according to an embodiment of this disclosure. The device enabling apparatus 1000 may be a wearable device or a smart device. As shown in FIG. 10, the device enabling apparatus 1000 includes a processor 1001 and a memory 1002.

The processor 1001 may include one or more processing cores, for example, a 4-core processor or an 8-core processor. The processor 1001 may be implemented in at least one hardware form of a DSP, an FPGA, or a PLA. The processor 1001 may also include a main processor and a coprocessor. The main processor is configured to process data when the device enabling apparatus 1000 is in an awake state, and is also referred to as a central processing unit. The coprocessor is configured to process data when the device enabling apparatus 1000 is in a standby state (a sleep state). In some embodiments, a graphics processing unit (GPU) may be integrated into the processor 1001, and the GPU is configured to be responsible for rendering and drawing content that needs to be displayed on a display screen. In some embodiments, the processor 1001 may further include an artificial intelligence (AI) processor, and the AI processor is configured to process a computing operation related to machine learning.

The memory 1002 may include one or more computer-readable storage media. The memory 1002 may further include a high-speed random access memory and a non-volatile memory, for example, one or more disk storage devices or flash storage devices. In some embodiments, the computer-readable storage medium in the memory 1002 is configured to store at least one instruction, and the at least one instruction is executed by the processor 1001 to implement the device enabling method provided in embodiments of this disclosure.

In some embodiments, the device enabling apparatus 1000 may further include a peripheral device interface 1003 and at least one peripheral device. The processor 1001, the memory 1002, and the peripheral device interface 1003 may be connected through a bus or a signal cable. Each peripheral device may be connected to the peripheral device interface 1003 through a bus, a signal cable, or a circuit board. For example, the peripheral device includes at least one of a radio frequency circuit 1004, a display screen 1005, a camera component 1006, an audio frequency circuit 1007, a positioning component 1008, and a power supply 1009.

The peripheral device interface 1003 may be configured to connect at least one peripheral device related to input/output to the processor 1001 and the memory 1002. In some embodiments, the processor 1001, the memory 1002, and the peripheral device interface 1003 are integrated on a same chip or circuit board. In some other embodiments, one or more of the processor 1001, the memory 1002, and the peripheral device interface 1003 may be implemented on a separate chip or circuit board. This is not limited in this embodiment of this disclosure.

The radio frequency circuit 1004 is configured to receive and transmit a radio frequency (RF) signal, and the radio frequency signal is also referred to as an electromagnetic signal. The radio frequency circuit 1004 communicates with a communication network and another communication device by using the electromagnetic signal. The radio frequency circuit 1004 converts an electrical signal into an electromagnetic signal for sending, or converts a received electromagnetic signal into an electrical signal. Optionally, the radio frequency circuit 1004 includes an antenna system, an RF transceiver, one or more amplifiers, a tuner, an oscillator, a digital signal processor, a codec chip set, a subscriber identity module card, and the like. The radio frequency circuit 1004 may communicate with another terminal according to at least one wireless communication protocol. The wireless communication protocol includes but is not limited to a world wide web, a metropolitan area network, an intranet, mobile communication networks of generations (2G, 3G, 4G, and 5G), a wireless local area network, and/or a Wi-Fi network. In some embodiments, the radio frequency circuit 1004 may further include a circuit related to near field communication (NFC). This is not limited in this embodiment of this disclosure.

The display screen 1005 is configured to display a user interface (UI). The UI may include a graph, text, an icon, a video, and any combination thereof. When the display screen 1005 is a touch display screen, the display screen 1005 further has a capability of collecting a touch signal on a surface or above a surface of the display screen 1005. The touch signal may be input as a control signal into the processor 1001 for processing. In this case, the display screen 1005 may be further configured to provide a virtual button and/or a virtual keyboard. The virtual button and/or the virtual keyboard is also referred to as a soft button and/or a soft keyboard. In some embodiments, there may be one display screen 1005, and the display screen 1005 is disposed on a front panel of the device enabling apparatus 1000. In some other embodiments, there may be at least two display screens 1005, and the display screens 1005 are disposed on different surfaces of the device enabling apparatus 1000 or are folded. In still some embodiments, the display screen 1005 may be a flexible display screen, and is disposed on a curved surface or a folded surface of the device enabling apparatus 1000. The display screen 1005 even may be set to a non-rectangular irregular pattern, namely, a special-shaped screen. The display screen 1005 may be an organic light-emitting diode (OLED) display screen.

The camera component 1006 is configured to capture an image or a video. The image or the video may include a face image and/or an eye image, to collect facial feature information based on the face image for identity authentication and/or collect iris feature information based on the eye image for identity authentication. Optionally, the camera component 1006 includes a front-facing camera and a rear-facing camera. Generally, the front-facing camera is disposed on a front panel of a device, and the rear-facing camera is disposed on a back surface of the device. In some embodiments, there are at least two rear-facing cameras, each of which is any one of a main camera, a depth-of-field camera, a wide-angle camera, a long-focus camera, and an RGB camera, to implement a background blurring function implemented through combined of the main camera and the depth-of-field camera, and to implement a panoramic photographing function, a VR photographing function, and another combined photographing function implemented through combined of the main camera and the wide-angle camera. In some embodiments, the camera component 1006 may further include a flash. The flash may be a single color temperature flash or a double color temperature flash. The double color temperature flash is a combination of a warm light flash and a cold light flash, and may be configured to perform light compensation at different color temperatures.

The audio frequency circuit 1007 may include a microphone and a loudspeaker. The microphone is configured to collect sound of a user and an environment; convert the sound into an electrical signal; and input the electrical signal to the processor 1001 for processing, or input the electrical signal to the radio frequency circuit 1004 to implement voice communication. For a purpose of stereo collection or noise reduction, there may be a plurality of microphones, which are separately disposed in different parts of the device enabling apparatus 1000. The microphone may be an array microphone or an omnidirectional microphone. The loudspeaker is configured to convert an electrical signal from the processor 1001 or the radio frequency circuit 1004 into a sound signal. The loudspeaker may be a conventional film loudspeaker, or may be a piezoelectric ceramic loudspeaker. When the loudspeaker is the piezoelectric ceramic loudspeaker, the loudspeaker not only converts an electrical signal into sound that can be heard by humans, but also converts the electrical signal into sound that cannot be heard by humans for purposes such as ranging. In some embodiments, the audio frequency circuit 1007 may further include a headset jack.

The positioning component 1008 is configured to position a geographical location of the device enabling apparatus 1000, to implement navigation or a location based service (LBS). The positioning component 1008 may be a positioning component based on a global positioning system (GPS) of the United States, a BeiDou system of China, or a Galileo system of Russia.

The power supply 1009 is configured to supply power to each component in the device enabling apparatus 1000. The power supply 1009 may be an alternating-current battery, a direct-current battery, a disposable battery, or a rechargeable battery. When the power supply 1009 includes the rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may be further configured to support a fast charging technology.

In some embodiments, the device enabling apparatus 1000 further includes one or more sensors 1010. The one or more sensors 1010 include but are not limited to an acceleration sensor 1011, a gyro sensor 1012, a pressure sensor 1013, a fingerprint sensor 1014, an optical sensor 1015, a proximity sensor 1016, a vibration sensor 1017, a brain-like sensor 1018, and an ultrasonic sensor 1019.

The acceleration sensor 1011 may detect acceleration magnitude on three coordinate axes of a coordinate system established by the device enabling apparatus 1000. For example, the acceleration sensor 1011 may be configured to detect components of gravity acceleration on the three coordinate axes. The processor 1001 may control, based on a gravity acceleration signal collected by the acceleration sensor 1011, the display screen 1005 to display the user interface in a transverse view or a longitudinal view. The acceleration sensor 1011 may be further configured to collect motion data of a game or the user.

The gyro sensor 1012 may detect a body direction and a rotation angle of the device enabling apparatus 1000, and the gyro sensor 1012 may cooperate with the acceleration sensor 1011 to collect a 3D action of the user on the device enabling apparatus 1000. The processor 1001 may implement, based on data collected by the gyro sensor 1012, the following functions: action sensing (for example, changing the UI based on a tilt operation of the user), image stabilization during photographing, game control, and inertial navigation.

The pressure sensor 1013 may be disposed on a side frame of the device enabling apparatus 1000 and/or at a lower layer of the touch display screen 1005. When the pressure sensor 1013 is disposed on the side frame of the device enabling apparatus 1000, a grip signal performed by the user on the device enabling apparatus 1000 may be detected, and the processor 1001 performs left and right hand recognition or a quick operation based on the grip signal collected by the pressure sensor 1013. When the pressure sensor 1013 is disposed at the lower layer of the touch display screen 1005, the processor 1001 controls an operability control on the UI interface based on a pressure operation performed by the user on the touch display screen 1005. The operability control includes at least one of a button control, a scroll bar control, an icon control, and a menu control.

The fingerprint sensor 1014 is configured to collect a fingerprint of the user; and the processor 1001 performs identity authentication on the user based on the fingerprint collected by the fingerprint sensor 1014, or the fingerprint sensor 1014 performs identity authentication on the user based on the collected fingerprint. When identity authentication succeeds, the processor 1001 authorizes the user to perform a related sensitive operation. The sensitive operation includes unlocking a screen, viewing encrypted information, downloading software, making payment, changing setting, and the like. The fingerprint sensor 1014 may be disposed on a front surface, a back surface, or a side surface of the device enabling apparatus 1000. When a physical button or a vendor logo is disposed on the device enabling apparatus 1000, the fingerprint sensor 1014 may be integrated with the physical button or the vendor logo.

The optical sensor 1015 is configured to collect ambient light intensity. In an embodiment, the processor 1001 may control display luminance of the touch display screen 1005 based on the ambient light intensity collected by the optical sensor 1015. For example, when the ambient light intensity is high, the display luminance of the touch display screen 1005 is increased; or when the ambient light intensity is low, the display luminance of the touch display screen 1005 is decreased. In another embodiment, the processor 1001 may further dynamically adjust a photographing parameter of the camera component 1006 based on the ambient light intensity collected by the optical sensor 1015.

The proximity sensor 1016, also referred to as a distance sensor, is usually disposed on the front panel of the device enabling apparatus 1000. The proximity sensor 1016 is configured to collect a distance between the user and the front surface of the device enabling apparatus 1000. In an embodiment, when the proximity sensor 1016 detects that the distance between the user and the front surface of the device enabling apparatus 1000 gradually decreases, the processor 1001 controls the touch display screen 1005 to switch from a screen-on state to a screen-off state. When the proximity sensor 1016 detects that the distance between the user and the front surface of the device enabling apparatus 1000 gradually increases, the processor 1001 controls the touch display screen 1005 to switch from the screen-off state to the screen-on state.

The vibration sensor 1017 may be a film sensor, and is configured to collect vibration feature information of the part on which the device enabling apparatus 1000 is worn, to perform identity authentication. For example, when the user speaks, the part on which the device enabling apparatus 1000 is worn vibrates, and the vibration sensor 1017 may collect the vibration feature information of the part. For example, the device enabling apparatus 1000 may be a smart headset, and the vibration sensor 1017 may collect vibration feature information of an ear of the user.

The brain-like sensor 1018 may be, for example, a brain-like camera, and is configured to collect vibration feature information of a user head. For example, when the user speaks, the user head vibrates. The brain-like sensor 1018 may collect vibration feature information of the user head. Because both the head and the ear vibrate when the user speaks, and a difference between vibration of the head and vibration of the ear is small, the vibration feature information collected by the brain-like sensor 1018 may be used as the vibration feature information of the ear of the user for identity authentication.

The ultrasonic sensor 1019 is configured to collect an ultrasonic signal. For example, the ultrasonic sensor 1019 may collect an ultrasonic signal reflected by an ear canal of the user, so that the device enabling apparatus 1000 can determine the ear canal feature information of the user based on the ultrasonic signal reflected by the ear canal of the user, and perform identity authentication on the user based on the ear canal feature information of the user.

Optionally, in some embodiments, the device enabling apparatus 1000 further includes an IMU 1020. The IMU 1020 may be implemented by the acceleration sensor and/or the gyro sensor. Therefore, the IMU 1020 may also be considered as a sensor of the device enabling apparatus 1000, and the IMU 1020 is configured to collect the vibration feature information of the ear of the user to perform identity authentication.

A person skilled in the art may understand that a structure shown in FIG. 10 does not constitute a limitation on the device enabling apparatus 1000; and the device enabling apparatus 1000 may include more or fewer components than those shown in the figure, or combine some components, or use different component arrangements.

An embodiment of this disclosure provides a device enabling system. The device enabling system includes at least one of a wearable device and a smart device, and the at least one of the wearable device and the smart device includes the device enabling apparatus shown in any one of FIG. 8 to FIG. 10.

An embodiment of this disclosure provides a computer-readable storage medium. The computer-readable storage medium stores a computer program. When the computer program runs on a computer, the computer is enabled to perform some or all steps of the device enabling method provided in the foregoing embodiments.

An embodiment of this disclosure provides a computer program product including instructions. When the computer program product runs on a computer, the computer is enabled to perform some or all steps of the device enabling method provided in the foregoing embodiments.

An embodiment of this disclosure provides a chip. The chip includes a programmable logic circuit and/or program instructions. When the chip runs, the chip is configured to implement some or all steps of the device enabling method provided in the foregoing embodiments.

All or some of foregoing embodiments may be implemented by using software, hardware, firmware, or any combination thereof. When the software is used to implement the embodiments, all or some of embodiments may be implemented in a form of a computer program product. The computer program product includes one or more computer instructions. When the computer program instructions are loaded and executed on a computer, all or some of the procedures or functions in embodiments of this disclosure are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state disk), or the like.

In this disclosure, terms such as "first", "second", and "third" are merely used for a purpose of description, and shall not be understood as an indication or implication of relative importance. The term "at least one" means one or more, the term "a plurality of" means two or more, and the term "at least one" means two or more, unless otherwise expressly limited. The term "and/or" describes only an association relationship between associated objects and indicates that there may be three relationships. For example, A and/or B may represent the following three cases: Only A exists, both A and B exist, and only B exists. The character "/" usually indicates an "or" relationship between the associated objects.

For different types of embodiments such as the method embodiment and the apparatus embodiment provided in embodiments of this disclosure, refer to each other. This is not limited in embodiments of this disclosure. A sequence of the operations of the method embodiment provided in embodiments of this disclosure can be properly adjusted, and the operations can be correspondingly added or deleted based on a situation. Any modified method that can be determined by a person skilled in the art without departing from a technical scope disclosed in this disclosure shall fall within the protection scope of this disclosure, and therefore details are not described again.

In the corresponding embodiments provided in this disclosure, it should be understood that the disclosed apparatus and the like may be implemented in other composition manners. For example, the foregoing described apparatus embodiments are merely examples. For example, division into the units is merely a logical function division and there may be another division during an actual implementation. For example, a plurality of units or components may be combined or integrated into another system, or some features may be ignored or may not be performed. In addition, the displayed or discussed mutual couplings, direct couplings, or communication connections may be implemented through some interfaces. The indirect couplings or communication connections between the apparatuses or units may be implemented in electronic or other forms.

Units described as separate parts may or may not be physically separate; and parts described as units may or may not be physical units, may be located in one position, or may be distributed on a plurality of network devices (such as smart devices). Some or all the units may be selected based on an actual requirement to achieve the objectives of the solutions of embodiments.

The foregoing descriptions are merely example implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A device enabling method comprising:
   collecting at least two types of biometric feature information of a user;
   performing an identity authentication on the user based on the at least two types of biometric feature information; and
   when the identity authentication succeeds, enabling at least one of a wearable device or a smart device, wherein the wearable device is communicatively connected to the smart device, wherein:
   the performance of the identity authentication on the user based on the at least two types of biometric feature information comprises:
   performing biometric authentication based on the at least two types of biometric feature information and a biometric authentication model; and
   determining an identity authentication result of the user based on a biometric authentication result of the biometric authentication;
   each type of the at least two types of biometric feature information corresponds to one of biometric authentication models, respectively, and each of the corresponding biometric authentication models is used to perform biometric authentication based on the corresponding biometric feature information;
   the performance of the biometric authentication based on the at least two types of biometric feature information and the biometric authentication model comprises:
   performing biometric authentication based on each type of biometric feature information and the corresponding biometric authentication models, to respectively obtain biometric authentication results corresponding to the biometric feature information; and
   the determining of the identity authentication result of the user based on the biometric authentication result comprises:
   determining the identity authentication result of the user based on the biometric authentication results respectively corresponding to the at least two types of biometric feature information; and
   the determining of the identity authentication result of the user based on the biometric authentication results corresponding to the at least two types of biometric feature information comprises:
   performing weighted calculation on the biometric authentication results corresponding to the at least two types of biometric feature information, and determining the identity authentication result of the user based on a result obtained through the weighted calculation wherein a sum of weights corresponding to the at least two types of biometric feature information is 1, and a weight corresponding to each type of biometric feature information is adjustable.

2. The method according to claim 1, wherein
   before the performing of biometric authentication based on the at least two types of biometric feature information and the biometric authentication model, the method further comprises:
   performing training based on sample data to generate the biometric authentication model.

3. The method according to claim 2, wherein
   each type of the at least two types of biometric feature information corresponds to one of biometric authentication models, respectively;
   the sample data comprises at least two types of sample feature information and sample authentication results corresponding to the at least two types of sample feature information, and each type of sample feature information is one respective type of biometric feature information; and
   the performing of training based on the sample data to generate the biometric authentication model comprises:
   inputting each type of sample feature information into an initial authentication model to perform feature authentication, to obtain a feature authentication result corresponding to the sample feature information;
   adjusting a model parameter of the initial authentication model based on the feature authentication result corresponding to the sample feature information and the sample authentication result corresponding to the sample feature information until a difference between the feature authentication result obtained through feature authentication based on the sample feature information and the sample authentication result corresponding to the sample feature information meets a preset condition; and
   determining an authentication model that meets the preset condition as the biometric authentication model corresponding to the biometric feature information.

4. The method according to claim 2, wherein
   the at least two types of biometric feature information correspond to one comprehensive biometric authentication model;
   the sample data comprises at least two types of sample feature information and a sample authentication result corresponding to the at least two types of sample feature information, and each type of sample feature information is one type of biometric feature information; and
   the performing of training based on the sample data to generate the biometric authentication model comprises:
   inputting the at least two types of sample feature information into an initial authentication model to perform feature authentication, to obtain a feature authentication result corresponding to the at least two types of sample feature information;
   adjusting a model parameter of the initial authentication model based on the feature authentication result corresponding to the at least two types of sample feature information and the sample authentication result corresponding to the at least two types of sample feature information until a difference between the feature authentication result obtained through feature authentication based on the at least two types of sample feature information and the sample authentication result corresponding to the at least two types of sample feature information meets a preset condition; and determining the authentication model that meets the preset condition as the biometric authentication model corresponding to the at least two types of biometric feature information.

5. The method according to claim 1, wherein the at least two types of biometric feature information comprise at least two types of ear canal feature information, auricle feature information, vibration feature information, voiceprint feature information, facial feature information, fingerprint feature information, and iris feature information; and the vibration feature information is vibration information of a part on which the wearable device is worn.

6. A device enabling apparatus comprising a processor and a memory; the memory stores a program; and the processor is configured to execute the program stored in the memory, so that the device enabling apparatus is at least configured to collect at least two types of biometric feature information of a user;

perform identity authentication on the user based on the at least two types of biometric feature information; and when the identity authentication succeeds, enable at least one of a wearable device or a smart device, wherein the wearable device is communicatively connected to the smart device, the performance of the identity authentication on the user based on the at least two types of biometric feature information comprises:

performance of biometric authentication based on the at least two types of biometric feature information and a biometric authentication model: and determination of an identity authentication result of the user based on a biometric authentication result of the biometric authentication each type of the at least two types of biometric feature information corresponds to one of biometric authentication models, respectively, and each of the corresponding biometric authentication models is used to perform the biometric authentication based on the corresponding biometric feature information:

the performance of the biometric authentication based on the at least two types of biometric feature information and the biometric authentication model comprises:

performance of biometric authentication based on each type of biometric feature information and the corresponding biometric authentication models, to respectively obtain biometric authentication results corresponding to the biometric feature information; and the determination of the identity authentication result of the user based on the biometric authentication result comprises:

performance of a weighted calculation on the biometric authentication results corresponding to the at least two types of biometric feature information, and determining the identity authentication result of the user based on a result obtained through the weighted calculation, wherein a sum of weights corresponding to the at least two types of biometric feature information is 1, and a weight corresponding to each type of biometric feature information is adjustable.

7. The apparatus according to claim 6, wherein the device enabling apparatus is further configured to:

before the performance of the biometric authentication based on the at least two types of biometric feature information and the biometric authentication model, perform training based on sample data to generate the biometric authentication model.

8. The apparatus according to claim 7, wherein each type of the at least two types of biometric feature information corresponds to one of biometric authentication model, respectively;

the sample data comprises at least two types of sample feature information and sample authentication results corresponding to the at least two types of sample feature information, and each type of sample feature information is one respective type of biometric feature information; and the performance of training based on the sample data to generate the biometric authentication model comprises:

input of each type of sample feature information into an initial authentication model to perform feature authentication, to obtain a feature authentication result corresponding to the sample feature information;

adjustment of a model parameter of the initial authentication model based on the feature authentication result corresponding to the sample feature information and the sample authentication result corresponding to the sample feature information until a difference between the feature authentication result obtained through feature authentication based on the sample feature information and the sample authentication result corresponding to the sample feature information meets a preset condition; and determination of an authentication model that meets the preset condition as the biometric authentication model corresponding to the biometric feature information.

9. The apparatus according to claim 7, wherein the at least two types of biometric feature information correspond to one comprehensive biometric authentication model;

the sample data comprises at least two types of sample feature information and a sample authentication result corresponding to the at least two types of sample feature information, and each type of sample feature information is one type of biometric feature information; and the performance of training based on the sample data to generate the biometric authentication model comprises:

input of the at least two types of sample feature information into an initial authentication model to perform feature authentication, to obtain a feature authentication result corresponding to the at least two types of sample feature information;

adjustment of a model parameter of the initial authentication model based on the feature authentication result corresponding to the at least two types of sample feature information and the sample authentication result corresponding to the at least two types of sample feature information until a difference between the feature authentication result obtained through feature authentication based on the at least two types of sample feature information and the sample authentication result corresponding to the at least two types of sample feature information meets a preset condition; and determination of the authentication model that meets the preset condition as the biometric authentication model corresponding to the at least two types of biometric feature information.

10. The apparatus according to claim 6, wherein
the at least two types of biometric feature information comprise at least two types of ear canal feature information, auricle feature information, vibration feature information, voiceprint feature information, facial feature information, fingerprint feature information, and iris feature information; and the vibration feature information is vibration information of a part on which the wearable device is worn.

11. A device enabling system comprising:
at least one of a wearable device and a smart device, and the at least one of the wearable device or the smart device comprises a device enabling apparatus, wherein the device enabling apparatus comprises a processor and a memory; the memory stores a program; and the processor is configured to execute the program stored in the memory, so that the device enabling apparatus is at least configured to:
collect at least two types of biometric feature information of a user;
perform identity authentication on the user based on the at least two types of biometric feature information; and
when the identity authentication succeeds, enable at least one of the wearable device or the smart device, wherein the wearable device is communicatively connected to the smart device,
wherein;
the performance of the identity authentication on the user based on the at least two types of biometric feature information comprises:
performance of biometric authentication based on the at least two types of biometric feature information and a biometric authentication model; and
determination of an identity authentication result of the user based on a biometric authentication result of the biometric authentication;
each type of the at least two types of biometric feature information corresponds to one of biometric authentication models, respectively, and each of the corresponding biometric authentication models is used to perform biometric authentication based on the corresponding biometric feature information:
the performance of the biometric authentication based on the at least two types of biometric feature information and the biometric authentication model comprises:
performance of biometric authentication based on each type of biometric feature information and the corresponding biometric authentication models, to respectively obtain biometric authentication results correspondi o the biometric feature information; and
the determination of the identity authentication result of the user based on the biometric authentication result comprises:
determination of the identity authentication result of the user based on the biometric authentication results respectively corresponding to the at least two types of biometric feature information;
the determination of the identity authentication result of the user based on the biometric authentication results corresponding to the at least two types of biometric feature information comprises: performance of a weighted calculation on the biometric authentication results corresponding to the at least two types of biometric feature information, and determining the identity authentication result of the user based on a result obtained through the weighted calculation, wherein a sum of weights corresponding to the at least two types of biometric feature information is 1, and a weight corresponding to each type of biometric feature information is adjustable.

12. The device enabling system according to claim 11, wherein the wearable device comprises either of a smart headset or smart glasses.

* * * * *